(12) United States Patent
Schreyer et al.

(10) Patent No.: US 12,478,959 B2
(45) Date of Patent: Nov. 25, 2025

(54) CONTINUOUS SYNTHESIS OF A TITANOSILICATE ZEOLITIC MATERIAL, SAID ZEOLITIC MATERIAL, MOLDING PREPARED THEREOF, AND THEIR USE

(71) Applicant: BASF SE, Ludwigshafen am Rhein (DE)

(72) Inventors: Hannah Schreyer, Ludwigshafen am Rhein (DE); Andrei-Nicolae Parvulescu, Ludwigshafen am Rhein (DE); Ulrich Mueller, Neustadt (DE); Dominic Riedel, Ludwigshafen am Rhein (DE); Jaroslaw Michael Mormul, Ludwigshafen am Rhein (DE); Ralf Boehling, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 190 days.

(21) Appl. No.: 17/785,856

(22) PCT Filed: Dec. 18, 2020

(86) PCT No.: PCT/EP2020/087104
§ 371 (c)(1),
(2) Date: Jun. 15, 2022

(87) PCT Pub. No.: WO2021/123227
PCT Pub. Date: Jun. 24, 2021

(65) Prior Publication Data
US 2023/0028936 A1    Jan. 26, 2023

(30) Foreign Application Priority Data
Dec. 19, 2019    (EP) .................... 19218167

(51) Int. Cl.
| | | |
|---|---|---|
| *B01J 29/89* | (2006.01) | |
| *B01J 20/16* | (2006.01) | |
| *B01J 20/30* | (2006.01) | |
| *B01J 29/00* | (2006.01) | |
| *B01J 37/00* | (2006.01) | |
| *B01J 37/02* | (2006.01) | |
| *B01J 37/03* | (2006.01) | |
| *B01J 37/04* | (2006.01) | |
| *B01J 37/06* | (2006.01) | |
| *B01J 37/10* | (2006.01) | |

(52) U.S. Cl.
CPC ............. *B01J 29/89* (2013.01); *B01J 20/16* (2013.01); *B01J 20/3007* (2013.01); *B01J 20/3014* (2013.01); *B01J 20/3042* (2013.01); *B01J 20/3057* (2013.01); *B01J 20/3071* (2013.01); *B01J 20/3078* (2013.01); *B01J 20/3085* (2013.01); *B01J 29/005* (2013.01); *B01J 37/0018* (2013.01); *B01J 37/0236* (2013.01); *B01J 37/031* (2013.01); *B01J 37/04* (2013.01); *B01J 37/06* (2013.01); *B01J 37/10* (2013.01); *B01J 2235/00* (2024.01); *B01J 2235/05* (2024.01); *B01J 2235/15* (2024.01)

(58) Field of Classification Search
None
See application file for complete search history.

(56) References Cited

U.S. PATENT DOCUMENTS

| | | | |
|---|---|---|---|
| 4,303,494 | A | 12/1981 | Whitehurst et al. |
| 4,374,093 | A | 2/1983 | Rollmann et al. |
| 6,656,447 | B1 | 12/2003 | Tannous et al. |
| 7,112,316 | B1 | 9/2006 | Konrad et al. |
| 2003/0152510 | A1 | 8/2003 | Senderov et al. |
| 2007/0059237 | A1 | 3/2007 | Miller |
| 2010/0331576 | A1 | 12/2010 | Carati et al. |
| 2016/0115039 | A1 | 4/2016 | Okubo et al. |
| 2016/0250624 | A1 | 9/2016 | Parvulescu et al. |
| 2019/0144290 | A1 | 5/2019 | Marx et al. |

FOREIGN PATENT DOCUMENTS

| | | | |
|---|---|---|---|
| CN | 105195226 | * | 12/2015 |
| CN | 106082259 | * | 11/2016 |
| CN | 110028078 | A | 7/2019 |
| CN | 110078091 | A | 8/2019 |
| DE | 3029787 | A1 | 2/1981 |

(Continued)

OTHER PUBLICATIONS

Hu et al., "Ultrafast synthesis of TS-1 without extraframework titanium species in a continuous flow system," Microporous and Mesoporous Materials, vol. 270. Nov. 1, 2018, pp. 149-154.
International Preliminary Report on Patentability received for PCT Patent Application No. PCT/EP2020/087104, mailed on Apr. 21, 2022, 13 pages.
International Search Report and Written Opinion received for PCT Patent Application No. PCT/EP2020/087104, mailed on Apr. 30, 2021, 20 pages.

(Continued)

*Primary Examiner* — Sheng H Davis
(74) *Attorney, Agent, or Firm* — Faegre Drinker Biddle & Reath LLP

(57) ABSTRACT

The present invention relates to a specific continuous process for preparing a zeolitic material having a framework structure type selected from the group consisting of MFI, MEL, IMF, SVY, FER, SVR, and intergrowth structures of two or more thereof, preferably an MFI- and/or MEL-type framework structure, comprising Si, Ti, and O, and to a zeolitic material as obtainable and/or obtained according to said process. Further, the present invention relates to a process for preparing a molding, and to a molding obtainable and/or obtained according to said process. Yet further, the present invention relates to a use of said zeolitic material and molding.

12 Claims, 3 Drawing Sheets

(56) References Cited

FOREIGN PATENT DOCUMENTS

| | | | |
|---|---|---|---|
| EP | 0402801 A2 | | 12/1990 |
| JP | 2011-506241 A | | 3/2011 |
| JP | 2016-535718 A | | 11/2016 |
| JP | 2019-524610 A | | 9/2019 |
| RU | 2140819 C1 | | 11/1999 |
| RU | 2364571 C1 | | 8/2009 |
| WO | 2014053483 | * | 4/2014 |
| WO | 2017216236 | * | 12/2017 |
| WO | WO-2017216236 A1 | * | 12/2017 ......... B01D 53/9418 |

OTHER PUBLICATIONS

"Product", Dictionaries and encyclopedias on Academician, Mar. 10, 2013.

Rabo, "Chemistry of zeolites and catalysis on zeolites" vol. 2, No. 1, 1980, pp. 422.

* cited by examiner

CONTINUOUS SYNTHESIS OF A TITANOSILICATE ZEOLITIC MATERIAL, SAID ZEOLITIC MATERIAL, MOLDING PREPARED THEREOF, AND THEIR USE

CROSS-REFERENCE TO RELATED APPLICATIONS

This application is a national stage application (under 35 U.S.C. § 371) of PCT/EP2020/087104, filed Dec. 18, 2020, which claims benefit of European Application No. 19218167.5, filed Dec. 19, 2019, both of which are incorporated herein by reference in their entirety.

TECHNICAL FIELD

The present invention relates to a specific continuous process for preparing a zeolitic material having a framework structure type selected from the group consisting of MFI, MEL, IMF, SVY, FER, SVR, and intergrowth structures of two or more thereof, wherein the framework structure comprises Si, Ti, and O. Further, the present invention relates to a zeolitic material as obtainable and/or obtained according to the inventive process and to a zeolitic material itself having a framework structure type selected from the group consisting of MFI, MEL, IMF, SVY, FER, SVR, and intergrowth structures of two or more thereof, wherein the framework structure comprises Si, Ti, and O. In addition to that, the present invention relates to a molding comprising the inventive zeolitic material and its preparation. Yet further, the present invention relates to a use of the inventive zeolitic material and the inventive molding.

INTRODUCTION

Titanium containing zeolitic materials of structure type MFI are known to be efficient catalysts including, for example, epoxidation reactions. In such industrial-scale processes, typically carried out in continuous mode, these zeolitic materials are usually employed in the form of moldings which, in addition to the catalytically active zeolitic material, comprise a suitable binder.

Y. Hu et al. disclose a study on ultrafast synthesis of TS-1 without extraframework titanium species in a continuous flow system. Further disclosed is a rapid continuous hydrothermal synthesis of nanoparticles of TS-1 using a tubular reactor, whereby a synthesis gel was used displaying a molar ratio in the range of 1 $SiO_2$:0.02 $TiO_2$:0.35 TPAOH:(16-35) $H_2O$.

CN110028078 A relates to a preparation method of a titanium silicon molecular sieve. The method comprises the steps of: mixing a silicon source, a templating agent, an alkali source and a titanium source. It is disclosed that the reactor may be of a tubular shape and that at least a portion of the mother liquor may be recycled in the method.

DE 3029787 A1 relates to a continuous process for preparing zeolites. EP 0402801 A2 relates to a method for the preparation of crystalline and zeolitic aluminosilicates. Further, U.S. Pat. No. 4,374,093 discloses a continuous-stream zeolite crystallization apparatus particularly comprising a combination of a tubular reactor, a central stirring element, ingress and egress means, and recovery vessels. Furthermore, U.S. Pat. No. 6,656,447 B1 discloses a continuous process for the preparation of a molecular sieve.

CN110078091 A discloses a method for continuously synthesizing titanium silicalite molecular sieve. The method comprises the following steps in series: preparing a continuous microdispersion system; preparing a dealcoholization precursor by a continuous aging dealcoholization system; and realizing rapid crystallization by a continuous crystallization system.

It was an object of the present invention to provide a novel process for preparing a zeolitic material having a framework structure type selected from the group consisting of MFI, MEL, IMF, SVY, FER, SVR, and intergrowth structures of two or more thereof, whereby the process is run continuously. In particular, it was an object to provide an improved process especially in view of procedural economics and resource efficiency.

Further, it was an object of the present invention to provide a novel zeolitic material having a framework structure type selected from the group consisting of MFI, MEL, IMF, SVY, FER, SVR, and intergrowth structures of two or more thereof, and also a novel molding comprising said zeolitic material, having advantageous characteristics, in particular an improved propylene oxide selectivity when used as a catalyst or catalyst component, in particular in the epoxidation reaction of propene to propylene oxide. It was a further object of the present invention to provide a process for the preparation of such a molding, in particular to provide a process resulting in a molding having advantageous properties, preferably when used as a catalyst or catalyst component, specifically in an oxidation or epoxidation reaction. It was a further object of the present invention to provide an improved process for the epoxidation of propene with hydrogen peroxide as oxidizing agent, exhibiting a very low selectivity with respect to by-products and side-products of the epoxidation reaction while, at the same time, allowing for a very high propylene selectivity.

DETAILED DESCRIPTION

Surprisingly, it was found that a process for preparing a zeolitic material having a framework structure type selected from the group consisting of MFI, MEL, IMF, SVY, FER, SVR, and inter-growth structures of two or more thereof can be run continuously wherein the process is particularly characterized in that a specific molar ratio of water to the one or more sources of silica in the synthesis gel is used. Thus, it has surprisingly been found that a synthesis gel can be used in a continuous process being comparatively more concentrated than a synthesis gel of the prior art. This led to the surprising effects that a preparation to a zeolitic material having a framework structure type selected from the group consisting of MFI, MEL, IMF, SVY, FER, SVR, and inter-growth structures of two or more thereof, wherein the framework structure can be run continuously avoiding the disadvantages of common batch processes, for example breaks in time between each batch process, thus, allowing for a higher throughput.

Further, it has surprisingly been found that a zeolitic material prepared according to the inventive process shows specific properties making it a potent material for use in catalytic reactions. In particular, it has been found that a zeolitic material displaying specific absorbances in the UV-VIS spectra shows an improved catalytic activity, in particular in the conversion of propylene to propylene oxide. Thus, it is assumed that the inventive process leads to a comparatively high content of pentavalent titanium in the zeolitic material which in turn is known to have a comparatively high catalytic activity.

According to the present invention, a molding is to be understood as a three-dimensional entity obtained from a shaping process; accordingly, the term "molding" is used synonymously with the term "shaped body".

Therefore, the present invention relates to a continuous process for preparing a zeolitic material having a framework structure type selected from the group consisting of MFI, MEL, IMF, SVY, FER, SVR, and intergrowth structures of two or more thereof, preferably having an MFI and/or MEL-type framework structure, more preferably having an MFI-type framework structure, comprising Si, Ti, and O, said process comprising
- (i) preparing a mixture comprising one or more sources of Si, one or more sources of Ti, one or more tetraalkylammonium cation $R^1R^2R^3R^4N^+$-containing compounds as structure directing agent, and water;
- (ii) continuously feeding the mixture prepared in (i) into a continuous flow reactor; and
- (iii) crystallizing the zeolitic material having a framework structure type selected from the group consisting of MFI, MEL, IMF, SVY, FER, SVR, and intergrowth structures of two or more thereof, preferably having an MFI- and/or MEL-type framework structure, more preferably having an MFI-type framework structure, from the mixture in the continuous flow reactor, wherein the mixture is heated to a temperature in the range of from 70 to 300° C.;
- wherein $R^1$, $R^2$, $R^3$, and $R^4$ independently from one another stand for alkyl, and
- wherein the $H_2O$:Si molar ratio of water to the one or more sources of Si calculated as $SiO_2$ in the mixture prepared in (i) is in the range of from 1 to 15.

Further, the present invention relates to a zeolitic material as obtainable and/or obtained according to the process of any one of the embodiments disclosed herein.

Yet further, the present invention relates to a zeolitic material, preferably a zeolitic material as obtainable and/or obtained according to the process of any one of the embodiments disclosed herein, said zeolitic material having a framework structure type selected from the group consisting of MFI, MEL, IMF, SVY, FER, SVR, and intergrowth structures of two or more thereof, preferably having an MFI- and/or MEL-type framework structure, more preferably having an MFI-type framework structure, comprising Si, Ti, and O, wherein in the wavelength range of 200 to 800 nm the zeolitic material displays a UV-vis spectrum having a first maximum in the range of from 200 to 230 nm, preferably of from 202 to 225 nm, more preferably of from 204 to 220 nm, more preferably of from 206 to 215 nm, and more preferably of from 208 to 210 nm,
and a second maximum in the range of from 235 to 320 nm, preferably of from 240 to 300 nm, more preferably of from 245 to 270 nm, more preferably of from 250 to 265 nm, and more preferably of from 258 to 262 nm, wherein the ratio of the absorbance of the first maximum to the absorbance of the second maximum is in the range of from 0.5 to 2.5, preferably of from 0.7 to 2, more preferably of from 0.9 to 1.8, more preferably of from 1 to 1.5, more preferably of from 1.1 to 1.3, and more preferably of from 1.15 to 1.25.

Yet further, the present invention relates to a process for preparing a molding, comprising
- (A) providing a zeolitic material according to any one of the embodiments disclosed herein;
- (B) mixing the zeolitic material provided in step (A) with one or more binders;
- (C) optionally kneading of the mixture obtained in step (B);
- (D) molding of the mixture obtained in step (B) or (C) to obtain one or more moldings;
- (E) drying of the one or more moldings obtained in step (D); and
- (F) calcining of the dried molding obtained in step (E).

Yet further, the present invention relates to a molding obtained or obtainable according to the process of any one of the embodiments disclosed herein.

Yet further, the present invention relates to a use of a zeolitic material according to any one of the embodiments disclosed herein or of a molding disclosed herein as a catalyst, catalyst support, adsorbent, or for ion exchange, wherein preferably the molding is used as a catalyst and/or catalyst support, more preferably as a catalyst and/or catalyst support in a reaction involving C—C bond formation and/or conversion, and preferably as a catalyst and/or catalyst support in an isomerization reaction, in an ammoxidation reaction, in an amination reaction, in a hydrocracking reaction, in an alkylation reaction, in an acylation reaction, in a reaction for the conversion of alkanes to olefins, or in a reaction for the conversion of one or more oxygenates to olefins and/or aromatics, in a reaction for the synthesis of hydrogen peroxide, in an aldol condensation reaction, in a reaction for the isomerization of epoxides, in a transesterification reaction, or in an epoxidation reaction, preferably as a catalyst and/or catalyst support in a reaction for the epoxidation of olefins, more preferably in a reaction for the epoxidation of C2-C5 alkenes, more preferably in a reaction for the epoxidation of C2-C4 alkenes, in a reaction for the epoxidation of C2 or C3 alkenes, more preferably for the epoxidation of C3 alkenes, and more preferably as a catalyst for the conversion of propylene to propylene oxide.

With respect to the continuous process for preparing a zeolitic material having a framework structure type selected from the group consisting of MFI, MEL, IMF, SVY, FER, SVR, and inter-growth structures of two or more thereof, preferably having an MFI- and/or MEL-type framework structure, it is preferred that the $H_2O$:Si molar ratio of water to the one or more sources of Si calculated as $SiO_2$ in the mixture prepared in (i) is in the range of from 2 to 13, more preferably from 3 to 11, more preferably from 4 to 10, more preferably from 4.5 to 9.5, more preferably from 5 to 9, more preferably from 5.5 to 8.5, more preferably from 6 to 8, and more preferably from 6.5 to 7.5.

It is preferred that continuous feeding in (ii) is performed at a liquid hourly space velocity in the range of from 0.05 to 5 $h^{-1}$, more preferably from 0.1 to 3 $h^{-1}$, more preferably from 0.3 to 2 $h^{-1}$, more preferably from 0.5 to 1.5 $h^{-1}$, more preferably from 0.7 to 1.3 $h^{-1}$, more preferably from 0.8 to 1.2 $h^{-1}$, and more preferably from 0.9 to 1.1 $h^{-1}$.

It is preferred that the volume of the continuous flow reactor is in the range of from 50 $cm^3$ to 75 $m^3$, more preferably from 55 $cm^3$ to 3 $m^3$, more preferably from 60 $cm^3$ to 1 $m^3$, more preferably from 65 $cm^3$ to 0.7 $m^3$, more preferably from 70 $cm^3$ to 0.3 $m^3$, more preferably from 75 $cm^3$ to 0.1 $m^3$, more preferably from 80 to 70,000 $cm^3$, more preferably from 85 to 50,000 $cm^3$, more preferably from 90 to 30,000 $cm^3$, more preferably from 95 to 10,000 $cm^3$, more preferably from 100 to 7,000 $cm^3$, more preferably from 105 to 5,000 $cm^3$, more preferably from 110 to 3,000 $cm^3$, more preferably from 115 to 1,000 $cm^3$, more preferably from 120 to 700 $cm^3$, more preferably from 125 to 500 $cm^3$, more preferably from 130 to 350 $cm^3$, more preferably from 135 to 250 $cm^3$, more preferably from 140 to 200 $cm^3$, more preferably from 145 to 180 $cm^3$, more preferably from 150 to 170 $cm^3$, and more preferably from 155 to 165 $cm^3$.

It is preferred that the continuous flow reactor is selected among a tubular reactor, a ring reactor, and a continuously oscillating reactor, more preferably among a plain tubular reactor, a tubular membrane reactor, a tubular reactor with Coanda effect, a ring reactor, a continuously oscillating baffled reactor, a Taylor-Couette reactor, and combinations thereof. More preferably, the continuous flow reactor is a plain tubular reactor and/or a ring reactor. It is particularly preferred that the continuous flow reactor is a plain tubular reactor.

It is preferred that the continuous flow reactor is a tubular reactor. In the case where the continuous flow reactor is a tubular reactor, it is preferred that at least a portion of the tubular reactor is of a regular cylindrical form having a constant inner diameter perpendicular to the direction of flow, wherein the inner diameter is preferably in the range of from 2 to 1200 mm, more preferably from 3 to 800 mm, more preferably from 4 to 500 mm, more preferably from 4.5 to 200 mm, more preferably from 4.5 to 100 mm, more preferably from 5 to 50 mm, more preferably from 5 to 30 mm, more preferably from 5.5 to 15 mm, more preferably from 5.5 to 10 mm, more preferably from 6 to 8 mm, and more preferably from 6 to 6.5 mm.

It is preferred that the continuous flow reactor has a length in the range of from 0.2 to 5,000 m, preferably from 0.5 to 3,000 m, more preferably from 1 to 1,000 m more preferably from 2 to 500 m more preferably from 3 to 200 m, more preferably from 4 to 100 m, more preferably from 4.5 to 50 m, more preferably from 4.5 to 30 m, more preferably from 4 to 20 m, more preferably from 4 to 15 m, more preferably from 4.5 to 10 m, and more preferably from 4.5 to 5.5 m.

It is preferred that the wall of the continuous flow reactor is made of a metallic material. In the case where the wall of the continuous flow reactor is made of a metallic material, it is preferred that the metallic material comprises one or more metals selected from the group consisting of Ta, Cr, Fe, Ni, Cu, Al, Mo, Ti, Zr, and combinations and/or alloys of two or more thereof, more preferably from the group consisting of Ta, Cr, Fe, Ni, Mo, and combinations and/or alloys of two or more thereof, preferably from the group consisting of Cr, Fe, Ni, Mo, and combinations and/or alloys of two or more thereof. It is particularly preferred that the metallic material comprises a nickel alloy, a nickel-molybdenum alloy, and more preferably a nickel-molybdenum-chromium alloy.

It is preferred that the surface of the inner wall of the continuous flow reactor is lined with an organic polymer material, wherein the organic polymer material preferably comprises one or more polymers selected from the group consisting of fluorinated polyalkylenes and mixtures of two or more thereof, preferably from the group consisting of (C2-C3)polyalkylenes and mixtures of two or more thereof, preferably from the group consisting of fluorinated polyethylenes and mixtures of two or more thereof, wherein more preferably the polymer material comprises poly(tetrafluoroethylene), wherein more preferably the inner wall of the continuous flow reactor is lined with poly(tetrafluoroethylene).

Alternatively, the surface of the inner wall of the continuous flow reactor is lined with a polysiloxane, preferably with a polysiloxane including a building block having the formula $[R_2SiO]_n$, wherein R is preferably an organic group, more preferably an alkyl and/or phenyl group.

Alternatively, the walls of the continuous flow reactor may comprise, preferably consist of, an organic polymer material, wherein the organic polymer material preferably comprises one or more polymers selected from the group consisting of fluorinated polyalkylenes and mixtures of two or more thereof, preferably from the group consisting of (C2-C3)polyalkylenes and mixtures of two or more thereof, preferably from the group consisting of fluorinated polyethylenes and mixtures of two or more thereof, wherein more preferably the polymer material comprises poly(tetrafluoroethylene), wherein more preferably the inner wall of the continuous flow reactor is lined with poly(tetrafluoroethylene).

It is preferred that the continuous flow reactor is straight and/or comprises one or more curves with respect to the direction of flow, wherein more preferably the continuous flow reactor is straight and/or has a coiled form with respect to the direction of flow.

It is preferred that the continuous flow reactor consists of a single stage.

It is preferred that no matter is added to and/or removed from the reaction mixture during its passage through the continuous flow reactor in (iii), wherein preferably no matter is added, wherein more preferably no matter is added and no matter is removed from the reaction mixture during its passage through the continuous flow reactor in (iii).

The flow regime in the reactor is preferably at least partially laminar. In the case where the reaction mixture displays a shear thinning rheology (pseudoplastic rheology), the velocity profile v(r) of the reaction mixture in the direction of flow fulfills the condition according to (I):

$$v(r) \leq ((v(r_1) - v_{min}) \cdot (r/r_1)) + v_{min} \quad (I)$$

and wherein in (iii) in instances wherein the reaction mixture displays a shear thickening rheology (dilatant rheology), the velocity profile v(r) of the reaction mixture in the direction of flow fulfills the condition according to (II):

$$v(r) \geq ((v(r_1) - v_{min}) \cdot (r/r_1)) + v_{min} \quad (II)$$

wherein r defines the length of a straight line on the cross-sectional area of the reactor space perpendicular to the flow direction of the reaction mixture in the reactor, wherein said straight line extends from a first point at the inner surface of the wall of the reactor in contact with the mixture, wherein at said first point $r_0$ is defined as 0 and v exhibits its minimum value ($v_{min} = v(r_0)$), to a second point where r is defined as $r_{max}$ and v exhibits its maximum value ($v_{max} = v(r_{max})$), wherein $r_1 = r_{max}/x$, and x=5.

It is preferred that $R^1$, $R^2$, $R^3$, and $R^4$ independently from one another stand for optionally branched $(C_1-C_6)$alkyl, preferably $(C_1-C_5)$alkyl, more preferably $(C_2-C_4)$alkyl, and more preferably for optionally branched $(C_2-C_3)$alkyl, wherein more preferably $R^1$, $R^2$, $R^3$, and $R^4$ independently from one another stand for ethyl or propyl, wherein more preferably $R^1$, $R^2$, $R^3$, and $R^4$ stand for propyl, preferably for n-propyl.

It is preferred that independently of one another the one or more tetraalkylammonium cation $R_1R_2R_3R_4N^+$-containing compounds are salts, more preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or chlorides, and more preferably tetraalkylammonium hydroxides.

It is preferred that the mixture prepared in (i) and crystallized in (iii) displays a molar ratio of the one or more tetraalkylammonium cation $R^1R^2R^3R^4N^+$-containing compounds to the one or more sources of Si calculated as $SiO_2$ in the range of from 0.001 to 1.5, more preferably from 0.005 to 1, more preferably from 0.01 to 0.7, more preferably from 0.05 to 0.5, more preferably from 0.07 to 0.4, more preferably from 0.1 to 0.3, more preferably from 0.13 to 0.25, more preferably from 0.15 to 0.22, and even more preferably from 0.17 to 0.19.

It is preferred that the one or more sources of Si comprises one or more compounds selected from the group consisting of silicas, silicates, and mixtures thereof,
preferably from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, tetraalkoxysilanes, and mixtures of two or more thereof,
more preferably from the group consisting of silica hydrosols, silica gel, silicic acid, water glass, sodium metasilicate hydrate, colloidal silica, silicic acid esters, tetraalkoxysilanes, and mixtures of two or more thereof,
more preferably from the group consisting of silica hydrosols, silicic acid, colloidal silica, silicic acid esters, tetraalkoxysilanes, and mixtures of two or more thereof,
wherein more preferably the one or more sources of Si comprise one or more tetraalkoxysilanes selected from the group consisting of $(C_1\text{-}C_6)$tetraalkoxysilanes and mixtures of two or more thereof, preferably $(C_1\text{-}C_5)$ tetraalkoxysilanes and mixtures of two or more thereof, more preferably $(C_1\text{-}C_4)$tetraalkoxysilanes and mixtures of two or more thereof, more preferably $(C_1\text{-}C_3)$ tetraalkoxysilanes and mixtures of two or more thereof, wherein more preferably the one or more sources of Si comprise tetramethoxysilane and/or tetraethoxysilane, preferably tetraethoxysilane, and wherein more preferably the one or more sources of Si is tetramethoxysilane and/or tetraethoxysilane, preferably tetraethoxysilane.

It is preferred that the one or more sources of Ti comprises one or more compounds selected from the group consisting of titanium oxides, titanium salts, titanyl compounds, titanic acids, titanic acid esters, and mixtures of two or more thereof, preferably one or more compounds selected from the group consisting of tetrabutyl orthotitanate, tetraisopropyl orthotitanate, tetraethyl orthotitanate, titanium dioxide, titanium tetrachloride, titanium tert-butoxide, $TiOSO_4$ and/or $KTiOPO_4$, and a mixture of two or more thereof, more preferably from the group consisting of tetrabutyl orthotitanate, tetraisopropyl orthotitanate, tetraethyl orthotitanate, titanium dioxide, titanium tetrachloride, titanium tert-butoxide, and a mixture of two or more thereof, the titanium source preferably being tetramethyl and/or tetraethyl orthotitanate, more preferably tetraethyl orthotitanate.

It is preferred that the mixture prepared in (i) contains substantially no phosphorous and/or phosphorous containing compounds.

It is preferred that the framework of the zeolitic material obtained in (iii) contains substantially no phosphorous, wherein preferably the zeolitic material obtained in (iii) contains substantially no phosphorous and/or phosphorous containing compounds.

It is preferred that the Si:Ti molar ratio of the one or more sources of Si, calculated as $SiO_2$, to the one or more sources of Ti, calculated as $TiO_2$, of the mixture prepared in (i) is in the range of from 1 to 500, more preferably from 2 to 200, more preferably from 5 to 150, more preferably from 10 to 100, more preferably from 20 to 70, more preferably from 25 to 50, more preferably from 30 to 45, and more preferably from 35 to 40.

It is preferred that in (ii) the mixture prepared in (i) is continuously fed into the continuous flow reactor for a duration in the range of from 3 h to 360 d, more preferably from 6 h to 120 d, more preferably from 12 h to 90 d, more preferably from 18 h to 60 d, more preferably from 1 to 30 d, more preferably from 1.5 to 25 d, more preferably from 2 to 20 d, more preferably from 2.5 to 15 d, more preferably from 3 to 12 d, more preferably from 3.5 to 8 d, and more preferably from 4 to 6 d.

It is preferred that in (iii) the mixture is heated to a temperature in the range of from 90 to 280° C., more preferably of from 110 to 250° C., more preferably of from 130 to 220° C., more preferably of from 150 to 200° C., more preferably of from 160 to 190° C., and more preferably of from 170 to 180° C.

It is preferred that in (iii) the mixture is heated under autogenous pressure, wherein preferably the pressure is in the range of from 0.5 to 15 MPa, more preferably in the range of from 1 to 10 MPa, more preferably from 1.5 to 8 MPa, more preferably from 2 to 6 MPa, more preferably from 2.5 to 5.5 MPa, more preferably from 3 to 5 MPa, more preferably from 3.5 to 4.5 MPa, and more preferably from 3.8 to 4.2 MPa.

It is preferred that prior to (ii) the mixture prepared in (i) is aged at a temperature in the range of from 40 to 120° C., more preferably from 50 to 115° C., more preferably from 60 to 110° C., more preferably from 70 to 105° C., more preferably from 80 to 100° C., and more preferably from 85 to 95° C.

It is preferred that prior to (ii) the mixture prepared in (i) is aged for a duration in the range of from 0.05 to 48 h, more preferably from 0.15 to 24 h, more preferably from 0.25 to 12 h, more preferably from 0.5 to 6 h, more preferably from 0.75 to 3 h, more preferably from 1 to 2 h, and more preferably from 1.25 to 1.75 h.

It is preferred that the mixture prepared in (i) is directly fed to the continuous flow reactor in (ii), wherein while being fed to the continuous flow reactor in (ii), the mixture prepared in (i) is preheated, preferably to a temperature in the range of from 90 to 280° C., more preferably of from 110 to 250° C., more preferably of from 130 to 220° C., more preferably of from 150 to 200° C., more preferably of from 160 to 190° C., and more preferably of from 170 to 180° C.

The process of the present invention may comprise further process steps. It is preferred that the process further comprises
(iv) treating the reaction product effluent continuously exiting the reactor in (iii) with a liquid comprising one or more solvents and/or via expansion of the reaction product effluent; and/or, preferably and,
(v) isolating the zeolitic material obtained in (iii) or (iv);
(vi) optionally washing the zeolitic material obtained in (iii), (iv) or (v);
(vii) drying the zeolitic material obtained in (iii), (iv), (v), or (vi); and/or, preferably and,
(viii) calcining the zeolitic material obtained in (iii), (iv), (v), (vi), or (vii).

In the case where the process further comprises (iv), it is preferred that in (iv) the liquid comprises one or more solvents selected from the group consisting of polar protic solvents and mixtures thereof,
preferably from the group consisting of n-butanol, isopropanol, propanol, ethanol, methanol, water, and mixtures thereof, more preferably from the group consisting of ethanol, methanol, water, and mixtures thereof, wherein more preferably the liquid comprises water, and wherein more preferably water is used as the liquid, preferably deionized water.

Further in the case where the process comprises (iv), it is preferred that in (iv) the liquid comprises one or more acids, more preferably one or more organic and/or inorganic acids, more preferably one or more inorganic acids, wherein the one or more inorganic acids are preferably selected from the group consisting of HCl, HBr, $HNO_3$, $H_2SO_4$, and mixtures of two or more thereof, more preferably from the group consisting of HCl, $HNO_3$, $H_2SO_4$, and mixtures of two or more thereof, wherein more preferably the one or more acids comprise HCl and/or $HNO_3$, preferably $HNO_3$, wherein more preferably the acid is HCl and/or $HNO_3$, preferably $HNO_3$.

In the case where in (iv) the liquid comprises one or more acids, it is preferred that in (iv) the reaction product effluent is neutralized with the one or more acids, preferably to a pH in the range of from 5 to 9, more preferably of from 6 to 8, and more preferably of from 6.5 to 7.5. The pH adjustment by neutralizing with the one or more acids as described herein is preferably carried out in the case where a filter press or a batch filtration is used for subsequent isolation of the zeolitic material according to (v).

In the case where the process comprises (vii), it is preferred that drying in (vii) is effected at a temperature in the range from 50 to 220° C., preferably from 70 to 190° C., more preferably from 80 to 170° C., more preferably from 90 to 150° C., more preferably from 100 to 140° C., and more preferably from 110 to 130° C.

In the case where the process comprises (viii), it is preferred that calcining in (viii) is effected at a temperature in the range from 300 to 700° C., more preferably from 375 to 625° C., more preferably from 425 to 575° C., more preferably from 470 to 530° C., and more preferably from 490 to 510° C.

In the case where the process comprises (v), it is preferred that the supernatant obtained from the isolation of the zeolitic material in (v), and/or a feed having the same composition as said supernatant, is not at any point recycled to the reaction mixture during its passage through the continuous flow reactor.

In the case where the process comprises (v) and/or (vii), it is preferred
that in (v) isolating the zeolitic material includes a step of spray-drying and/or microwave drying the zeolitic material obtained in (iii) or (iv),
and/or
that in (vii) drying of the zeolitic material includes a step of spray-drying and/or microwave drying the zeolitic material obtained in (iii), (iv), (v), or (vi).

It is preferred that the mixture constituting the feed crystallized in (iii) consists of two liquid phases, wherein the first liquid phase is an aqueous phase comprising water, and the second liquid phase comprises a lubricating agent.

In the case where the mixture constituting the feed crystallized in (iii) consists of two liquid phases, wherein the first liquid phase is an aqueous phase comprising water, and the second liquid phase comprises a lubricating agent, it is preferred that the lubricating agent comprises one or more fluorinated compounds, more preferably one or more fluorinated polymers, more preferably one or more fluorinated polyethers, and more preferably one or more perfluorinated polyethers.

Further in the case where the mixture constituting the feed crystallized in (iii) consists of two liquid phases, wherein the first liquid phase is an aqueous phase comprising water, and the second liquid phase comprises a lubricating agent, it is preferred that the lubricating agent comprises one or more fluorinated compounds, more preferably one or more fluorocarbons, more preferably one or more perfluorocarbons, more preferably the lubricating agent comprises perfluorodecalin. In addition thereto or alternatively thereto, the lubricating agent may comprise liquid paraffin.

It is preferred that the mixture crystallized in (iii) in the continuous flow reactor is mechanically agitated, wherein preferably mechanical agitation is achieved by movable parts contained in the continuous flow reactor, wherein more preferably the movable parts are provided such as to continually or periodically, preferably to continually free the walls of the continuous flow reactor from zeolitic materials and/or solid residue attached thereto, wherein more preferably the movable parts comprise a scraper, more preferably a screw, and more preferably a rotating screw.

As mentioned above, the process of the present invention may comprise further process steps. It is preferred that the process further comprises
(ix) subjecting the zeolitic material obtained in (v), (vi), (vii), or (viii) to an impregnation procedure, wherein one or more metal ion containing compounds are impregnated into the zeolitic material.

In the case where the process further comprises (ix), it is preferred that the one or more metal ions are selected from the group consisting of ions of alkaline earth metal elements and/or transition metal elements, more preferably from the group consisting of ions of metals selected from group Mg, Sr, Zr, Cr, Mo, Fe, Co, Ni, Cu, Zn, Ru, Rh, Pd, Ag, Os, Ir, Pt, Au, and mixtures of two or more thereof, more preferably from the group consisting of Mg, Sr, Cr, Mo, Fe, Co, Ni, Cu, Zn, Pt, Pd, Ag, and mixtures of two or more thereof, more preferably from the group consisting of Mg, Cr, Mo, Fe, Ni, Cu, Zn, Pt, Pd, Ag, and mixtures of two or more thereof, and even more preferably from the group consisting of Zn, Pd, Pt, and mixtures of two or more thereof.

Further, the present invention relates to a zeolitic material as obtainable and/or obtained according to the process of any one of the embodiments disclosed herein.

Yet further, the present invention relates to a zeolitic material, preferably a zeolitic material as obtainable and/or obtained according to the process of any one of the embodiments disclosed herein, said zeolitic material having a framework structure type selected from the group consisting of MFI, MEL, IMF, SVY, FER, SVR, and intergrowth structures of two or more thereof, preferably having an MFI- and/or MEL-type framework structure, more preferably having an MFI-type framework structure, comprising Si Ti, and O, wherein in the wavelength range of 200 to 800 nm the zeolitic material displays a UV-vis spectrum having a first maximum in the range of from 200 to 230 nm, preferably of from 202 to 225 nm, more preferably of from 204 to 220 nm, more preferably of from 206 to 215 nm, and more preferably of from 208 to 210 nm,
and a second maximum in the range of from 235 to 320 nm, preferably of from 240 to 300 nm, more preferably of from 245 to 270 nm, more preferably of from 250 to 265 nm, and more preferably of from 258 to 262 nm, wherein the ratio of the absorbance of the first maximum to the absorbance of the second maximum is in the range of from 0.5 to 2.5, preferably of from 0.7 to 2, more preferably of from 0.9 to 1.8, more preferably of from 1 to 1.5, more preferably of from 1.1 to 1.3, and more preferably of from 1.15 to 1.25.

It is preferred that the UV-vis spectrum displays no further maximum between the first and second maxima.

It is preferred that the first and second maximum have the highest absorbance in the 200 to 800 nm range of the UV-vis spectrum, wherein it is further preferred that the second maximum has the highest absorbance below 330 nm.

It is preferred that the deconvoluted $^{29}$Si MAS NMR of the zeolitic material comprises:
  a first peak (P"1) having a maximum in the range of from −111.5 to −114.5 ppm, preferably of from −112 to −114 ppm, and even more preferably of from −112.5 to −113.5 ppm; and
  a second peak (P"2) having a maximum in the range of from −101 to −105 ppm, preferably of from −102 to −104 ppm, and even more preferably of from −102.5 to −103.5 ppm, wherein the deconvoluted $^{29}$Si MAS NMR of the zeolitic material is preferably determined according to Reference Example 1.

In the case where the deconvoluted $^{29}$Si MAS NMR of the zeolitic material comprises a first peak (P"1) having a maximum in the range of from −111.5 to −114.5 ppm and a second peak (P"2) having a maximum in the range of from −101 to −105 ppm, it is preferred that the deconvoluted $^{29}$Si MAS NMR spectrum comprises one additional peak having a maximum in the range of from −114.6 to −118 ppm, more preferably of from −115 to −117 ppm, and even more preferably of from −115.5 to −116.5 ppm.

It is preferred that the zeolitic material displays a BET specific surface area as determined according to ISO 9277: 2010 in the range of from 300 to 700 m$^2$/g, more preferably in the range of from 350 to 600 m$^2$/g, more preferably in the range of from 400 to 550 m$^2$/g, more preferably in the range of from 450 to 500 m2/g.

It is preferred that the zeolitic material displays a water adsorption ranging from 8 to 15 weight-% when exposed to a relative humidity of 85%, wherein preferably the water adsorption ranges from 9 to 14 weight-%, more preferably from 10 to 13.5 weight-%, more preferably from 11 to 13 weight-%, and more preferably from 11.0 to 13.0 weight-%, wherein the water adsorption is preferably determined according to Reference Example 2.

It is preferred that the Si:Ti molar ratio of the zeolitic material ranges from 1 to 500, more preferably from 2 to 200, more preferably from 5 to 150, more preferably from 10 to 100, more preferably from 20 to 70, more preferably from 25 to 50, more preferably from 30 to 45, and more preferably from 35 to 40.

It is preferred that the zeolitic material having an MFI-type framework structure comprises TS-1, wherein more preferably the zeolitic material is TS-1.

It is preferred that the zeolitic material is impregnated with one or more metal ion containing compounds, wherein the one or more metal ions are selected from the group consisting of ions of alkaline earth metal elements and/or transition metal elements, more preferably from the group consisting of ions of metals selected from group Mg, Sr, Zr, Cr, Mo, Fe, Co, Ni, Cu, Zn, Ru, Rh, Pd, Ag, Os, Ir, Pt, Au, and mixtures of two or more thereof, more preferably from the group consisting of Mg, Sr, Cr, Mo, Fe, Co, Ni, Cu, Zn, Ag, and mixtures of two or more thereof, more preferably from the group consisting of Mg, Cr, Mo, Fe, Ni, Cu, Zn, Ag, and mixtures of two or more thereof, and even more preferably from the group consisting of Mg, Mo, Fe, Ni, Cu, Zn, Ag, and mixtures of two or more thereof.

It is preferred that the framework of the zeolitic material contains substantially no phosphorous, wherein preferably the zeolitic material contains substantially no phosphorous and/or phosphorous containing compounds.

Yet further, the present invention relates to a process for preparing a molding, comprising
  (A) providing a zeolitic material according to any one of the embodiments disclosed herein;
  (B) mixing the zeolitic material provided in step (A) with one or more binders;
  (C) optionally kneading of the mixture obtained in step (B);
  (D) molding of the mixture obtained in step (B) or (C) to obtain one or more moldings;
  (E) drying of the one or more moldings obtained in step (D); and
  (F) calcining of the dried molding obtained in step (E)

It is preferred that the one or more binders are selected from the group consisting of inorganic binders, wherein the one or more binders preferably comprise one or more sources of a metal oxide and/or of a metalloid oxide, more preferably one or more sources of a metal oxide and/or of a metalloid oxide selected from the group consisting of silica, alumina, titania, zirconia, lanthana, magnesia, and mixtures and/or mixed oxides of two or more thereof, more preferably from the group consisting of silica, alumina, titania, zirconia, magnesia, silica-alumina mixed oxides, silica-titania mixed oxides, silica-zirconia mixed oxides, silica-lanthana mixed oxides, silica-zirconia-lanthana mixed oxides, alumina-titania mixed oxides, alumina-zirconia mixed oxides, alumina-lanthana mixed oxides, alumina-zirconia-lanthana mixed oxides, titania-zirconia mixed oxides, and mixtures and/or mixed oxides of two or more thereof, more preferably from the group consisting of silica, alumina, silica-alumina mixed oxides, and mixtures of two or more thereof, wherein more preferably the one or more binders comprise one or more sources of silica, wherein more preferably the binder consists of one or more sources of silica, wherein the one or more sources of silica preferably comprise one or more compounds selected from the group consisting of fumed silica, colloidal silica, silica-alumina, colloidal silica-alumina, and mixtures of two or more thereof, more preferably one or more compounds selected from the group consisting of fumed silica, colloidal silica, and mixtures thereof, wherein more preferably the one or more binders consists of colloidal silica.

It is preferred that step (B) further comprises mixing the zeolitic material and the one or more binders with a solvent system, wherein the solvent system comprises one or more solvents, wherein preferably the solvent system comprises one or more hydrophilic solvents, the hydrophilic solvents preferably being selected from the group consisting of polar solvents, more preferably from the group consisting of polar protic solvents, wherein more preferably the solvent system comprises one or more polar protic solvents selected from the group consisting of water, alcohols, carboxylic acids, and mixtures of two or more thereof, more preferably from the group consisting of water, C1-C5 alcohols, C1-C5 carboxylic acids, and mixtures of two or more thereof, more preferably from the group consisting of water, C1-C4 alcohols, C1-C4 carboxylic acids, and mixtures of two or more thereof, more preferably from the group consisting of water, C1-C3 alcohols, C1-C3 carboxylic acids, and mixtures of two or more thereof, more preferably from the group consisting of water, methanol, ethanol, propanol, formic acid, acetic acid, and mixtures of two or more thereof, more preferably from the group consisting of water, ethanol, acetic acid, and mixtures of two or more thereof, wherein more preferably the solvent system comprises water and/or ethanol, and wherein more preferably the solvent system comprises water, wherein even more preferably the solvent system consists of water.

It is preferred that step (B) further comprises mixing the zeolitic material and the one or more binders with one or more pore forming agents and/or lubricants and/or plasticizers, wherein the one or more pore forming agents and/or lubricants and/or plasticizers are preferably selected from the group consisting of polymers, carbohydrates, graphite, plant additives, and mixtures of two or more thereof, more preferably from the group consisting of polymeric vinyl compounds, polyalkylene oxides, polyacrylates, polyolefins, polyamides, polyesters, cellulose and cellulose derivatives, sugars, sesbania cannabina, and mixtures of two or more thereof, more preferably from the group consisting of polystyrene, C2-C3 polyalkylene oxides, cellulose derivatives, sugars, and mixtures of two or more thereof, more preferably from the group consisting of polystyrene, polyethylene oxide, C1-C2 hydroxyalkylated and/or C1-C2 alkylated cellulose derivatives, sugars, and mixtures of two or more thereof, more preferably from the group consisting of polystyrene, polyethylene oxide, hydroxyethyl methyl cellulose, and mixtures of two or more thereof, wherein more preferably the one or more pore forming agents and/or lubricants and/or plasticizers consists of one or more selected from the group consisting of polystyrene, polyethylene oxide, hydroxyethyl methyl cellulose, and mixtures of two or more thereof, and more preferably wherein the one or more pore forming agents and/or lubricants and/or plasticizers consist of a mixture of polystyrene, polyethylene oxide, and hydroxyethyl methyl cellulose. In this regard, it is preferred that a plant additive is typically dried and/or milled such that the plant additive is preferably provided in the form of a powder. For example, the indication of sesbania cannabina can be understood as meaning a pore forming agent, lubricant, or plasticizer based on said plant and provided in a suitable form, in particular in the form of a powder.

It is preferred that calcining of the dried molding obtained in step (E) is performed at a temperature ranging from 350 to 850° C., more preferably from 400 to 700° C., more preferably from 450 to 650° C., and more preferably from 475 to 600° C.

The process for preparing a molding may comprise further process steps. It is preferred that the process for preparing a molding further comprises
 (G) subjecting the calcined molding obtained in step (F) to a hydrothermal treatment;
 wherein preferably the hydrothermal treatment is conducted under autogenous pressure,
 wherein more preferably the hydrothermal treatment is conducted at a temperature ranging from 80 to 200° C., preferably from 90 to 180° C., more preferably from 100 to 170° C., more preferably from 110 to 160° C., and more preferably from 120 to 150° C.

In the case where the process for preparing a molding further comprises (G), it is preferred that the hydrothermal treatment is performed with a water containing solvent system and/or with an aqueous solution, wherein preferably the hydrothermal treatment is performed with distilled water or with an acidic solution having a pH in the range of from 3 to 6.5, more preferably of from 4 to 5.5.

Further in the case where the process for preparing a molding further comprises (G), it is preferred that the hydrothermal treatment is performed for a duration ranging from 1 to 48 hours, more preferably from 2 to 36 hours, more preferably from 4 to 24 hours, more preferably from 5 to 12 hours, more preferably from 2 to 9 hours.

Yet further, the present invention relates to a molding obtained or obtainable according to the process of any one of the embodiments disclosed herein.

Yet further, the present invention relates to a use of a zeolitic material according to any one of the embodiments disclosed herein or of a molding disclosed herein as a catalyst, catalyst support, adsorbent, or for ion exchange, wherein preferably the molding is used as a catalyst and/or catalyst support, more preferably as a catalyst and/or catalyst support in a reaction involving C—C bond formation and/or conversion, and preferably as a catalyst and/or catalyst support in an isomerization reaction, in an ammoxidation reaction, in an amination reaction, in a hydrocracking reaction, in an alkylation reaction, in an acylation reaction, in a reaction for the conversion of alkanes to olefins, or in a reaction for the conversion of one or more oxygenates to olefins and/or aromatics, in a reaction for the synthesis of hydrogen peroxide, in an aldol condensation reaction, in a reaction for the isomerization of epoxides, in a transesterification reaction, or in an epoxidation reaction, preferably as a catalyst and/or catalyst support in a reaction for the epoxidation of olefins, more preferably in a reaction for the epoxidation of C2-C5 alkenes, more preferably in a reaction for the epoxidation of C2-C4 alkenes, in a reaction for the epoxidation of C2 or C3 alkenes, more preferably for the epoxidation of C3 alkenes, and more preferably as a catalyst for the conversion of propylene to propylene oxide.

The unit bar(abs) refers to an absolute pressure of $10^5$ Pa.

The present invention is further illustrated by the following set of embodiments and combinations of embodiments resulting from the dependencies and back-references as indicated. In particular, it is noted that in each instance where a range of embodiments is mentioned, for example in the context of a term such as "The continuous process of any one of embodiments 1 to 4", every embodiment in this range is meant to be explicitly disclosed for the skilled person, i.e. the wording of this term is to be understood by the skilled person as being synonymous to "The continuous process of any one of embodiments 1, 2, 3, and 4". Further, it is explicitly noted that the following set of embodiments is not the set of claims determining the extent of protection, but represents a suitably structured part of the description directed to general and preferred aspects of the present invention.

1. A continuous process for preparing a zeolitic material having a framework structure type selected from the group consisting of MFI, MEL, IMF, SVY, FER, SVR, and intergrowth structures of two or more thereof, preferably having an MFI- and/or MEL-type framework structure, more preferably having an MFI-type framework structure, comprising Si, Ti, and O, said process comprising
 (i) preparing a mixture comprising one or more sources of Si, one or more sources of Ti, one or more tetraalkylammonium cation $R^1R^2R^3R^4N^+$-containing compounds as structure directing agent, and water;
 (ii) continuously feeding the mixture prepared in (i) into a continuous flow reactor; and
 (iii) crystallizing the zeolitic material having a framework structure type selected from the group consisting of MFI, MEL, IMF, SVY, FER, SVR, and intergrowth structures of two or more thereof, preferably having an MFI- and/or MEL-type framework structure, more preferably having an MFI-type framework structure, from the mixture in the continuous flow reactor, wherein the mixture is heated to a temperature in the range of from 70 to 300° C.;

wherein $R^1$, $R^2$, $R^3$, and $R^4$ independently from one another stand for alkyl, and wherein the $H_2O$:Si molar ratio of water to the one or more sources of Si calculated as $SiO_2$ in the mixture prepared in (i) is in the range of from 1 to 15.

2. The process of embodiment 1, wherein the $H_2O$:Si molar ratio of water to the one or more sources of Si calculated as $SiO_2$ in the mixture prepared in (i) is in the range of from 2 to 13, preferably from 3 to 11, more preferably from 4 to 10, more preferably from 4.5 to 9.5, more preferably from 5 to 9, more preferably from 5.5 to 8.5, more preferably from 6 to 8, and more preferably from 6.5 to 7.5.

3. The process of embodiment 1 or 2, wherein continuous feeding in (ii) is performed at a liquid hourly space velocity in the range of from 0.05 to 5 $h^{-1}$, more preferably from 0.1 to 3 $h^{-1}$, more preferably from 0.3 to 2 $h^{-1}$, more preferably from 0.5 to 1.5 $h^{-1}$, more preferably from 0.7 to 1.3 $h^{-1}$, more preferably from 0.8 to 1.2 $h^{-1}$, and more preferably from 0.9 to 1.1 $h^{-1}$.

4. The process of any one of embodiments 1 to 3, wherein the volume of the continuous flow reactor is in the range of from 50 $cm^3$ to 75 $m^3$, preferably from 55 $cm^3$ to 3 $m^3$, more preferably from 60 $cm^3$ to 1 $m^3$, more preferably from 65 $cm^3$ to 0.7 $m^3$, more preferably from 70 $cm^3$ to 0.3 $m^3$, more preferably from 75 $cm^3$ to 0.1 $m^3$, more preferably from 80 to 70,000 $cm^3$, more preferably from 85 to 50,000 $cm^3$, more preferably from 90 to 30,000 $cm^3$, more preferably from 95 to 10,000 $cm^3$, more preferably from 100 to 7,000 $cm^3$, more preferably from 105 to 5,000 $cm^3$, more preferably from 110 to 3,000 $cm^3$, more preferably from 115 to 1,000 $cm^3$, more preferably from 120 to 700 $cm^3$, more preferably from 125 to 500 $cm^3$, more preferably from 130 to 350 $cm^3$, more preferably from 135 to 250 $cm^3$, more preferably from 140 to 200 $cm^3$, more preferably from 145 to 180 $cm^3$, more preferably from 150 to 170 $cm^3$, and more preferably from 155 to 165 $cm^3$.

5. The process of any one of embodiments 1 to 4, wherein the continuous flow reactor is selected among a tubular reactor, a ring reactor, and a continuously oscillating reactor, preferably among a plain tubular reactor, a tubular membrane reactor, a tubular reactor with Coanda effect, a ring reactor, a continuously oscillating baffled reactor, a Taylor-Couette reactor, and combinations thereof, wherein more preferably the continuous flow reactor is a plain tubular reactor and/or a ring reactor, wherein more preferably the continuous flow reactor is a plain tubular reactor.

6. The process of any one of embodiments 1 to 5, wherein the continuous flow reactor is a tubular reactor, and wherein at least a portion of the tubular reactor is of a regular cylindrical form having a constant inner diameter perpendicular to the direction of flow, wherein the inner diameter is preferably in the range of from 2 to 1200 mm, more preferably from 3 to 800 mm, more preferably from 4 to 500 mm, more preferably from 4.5 to 200 mm, more preferably from 4.5 to 100 mm, more preferably from 5 to 50 mm, more preferably from 5 to 30 mm, more preferably from 5.5 to 15 mm, more preferably from 5.5 to 10 mm, more preferably from 6 to 8 mm, and more preferably from 6 to 6.5 mm.

7. The process of any one of embodiments 1 to 6, wherein the continuous flow reactor has a length in the range of from 0.2 to 5,000 m, preferably from 0.5 to 3,000 m, more preferably from 1 to 1,000 m more preferably from 2 to 500 m more preferably from 3 to 200 m, more preferably from 4 to 100 m, more preferably from 4.5 to 50 m, more preferably from 4.5 to 30 m, more preferably from 4 to 20 m, more preferably from 4 to 15 m, more preferably from 4.5 to 10 m, and more preferably from 4.5 to 5.5 m.

8. The process of any one of embodiments 1 to 7, wherein the wall of the continuous flow reactor is made of a metallic material, wherein the metallic material comprises one or more metals selected from the group consisting of Ta, Cr, Fe, Ni, Cu, Al, Mo, Ti, Zr, and combinations and/or alloys of two or more thereof, preferably from the group consisting of Ta, Cr, Fe, Ni, Mo, and combinations and/or alloys of two or more thereof, preferably from the group consisting of Cr, Fe, Ni, Mo, and combinations and/or alloys of two or more thereof wherein preferably the metallic material comprises a nickel alloy, a nickel-molybdenum alloy, and more preferably a nickel-molybdenum-chromium alloy.

9. The process of any one of embodiments 1 to 8, wherein the surface of the inner wall of the continuous flow reactor is lined with an organic polymer material, wherein the organic polymer material preferably comprises one or more polymers selected from the group consisting of fluorinated polyalkylenes and mixtures of two or more thereof, preferably from the group consisting of (C2-C3)polyalkylenes and mixtures of two or more thereof, preferably from the group consisting of fluorinated polyethylenes and mixtures of two or more thereof, wherein more preferably the polymer material comprises poly(tetrafluoroethylene), wherein more preferably the inner wall of the continuous flow reactor is lined with poly(tetrafluoroethylene).

10. The process of any one of embodiments 1 to 9, wherein the surface of the inner wall of the continuous flow reactor is lined with a polysiloxane, preferably with a polysiloxane including a building block having the formula $[R_2SiO]_n$, wherein R is preferably an organic group, more preferably an alkyl and/or phenyl group.

11. The process of any one of embodiments 1 to 10, wherein the continuous flow reactor is straight and/or comprises one or more curves with respect to the direction of flow, wherein preferably the continuous flow reactor is straight and/or has a coiled form with respect to the direction of flow.

12. The process of any one of embodiments 1 to 11, wherein the continuous flow reactor consists of a single stage.

13. The process of any one of embodiments 1 to 12, wherein no matter is added to and/or removed from the reaction mixture during its passage through the continuous flow reactor in (iii), wherein preferably no matter is added, wherein more preferably no matter is added and no matter is removed from the reaction mixture during its passage through the continuous flow reactor in (iii).

14. The process of any one of embodiments 1 to 13, wherein $R^1$, $R^2$, $R^3$, and $R^4$ independently from one another stand for optionally branched $(C_1-C_6)$alkyl, preferably $(C_1-C_5)$alkyl, more preferably $(C_2-C_4)$alkyl, and more preferably for optionally branched $(C_2-C_3)$ alkyl, wherein more preferably $R^1$, $R^2$, $R^3$, and $R^4$ independently from one another stand for ethyl or propyl, wherein more preferably $R^1$, $R^2$, $R^3$, and $R^4$ stand for propyl, preferably for n-propyl.

15. The process of any one of embodiments 1 to 14, wherein independently of one another the one or more tetraalkylammonium cation $R^1R^2R^3R^4N^+$-containing compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or chlorides, and more preferably tetraalkylammonium hydroxides.

16. The process of any one of embodiments 1 to 15, wherein the mixture prepared in (i) and crystallized in (iii) displays a molar ratio of the one or more tetraalkylammonium cation $R^1R^2R^3R^4N^+$-containing compounds to the one or more sources of Si calculated as $SiO_2$ in the range of from 0.001 to 1.5, preferably from 0.005 to 1, more preferably from 0.01 to 0.7, more preferably from 0.05 to 0.5, more preferably from 0.07 to 0.4, more preferably from 0.1 to 0.3, more preferably from 0.13 to 0.25, more preferably from 0.15 to 0.22, and even more preferably from 0.17 to 0.19.

17. The process of any one of embodiments 1 to 16, wherein the one or more sources of Si comprises one or more compounds selected from the group consisting of silicas, silicates, and mixtures thereof,
preferably from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, tetraalkoxysilanes, and mixtures of two or more thereof,
more preferably from the group consisting of silica hydrosols, silica gel, silicic acid, water glass, sodium metasilicate hydrate, colloidal silica, silicic acid esters, tetraalkoxysilanes, and mixtures of two or more thereof,
more preferably from the group consisting of silica hydrosols, silicic acid, colloidal silica, silicic acid esters, tetraalkoxysilanes, and mixtures of two or more thereof,
wherein more preferably the one or more sources of Si comprise one or more tetraalkoxysilanes selected from the group consisting of ($C_1$-$C_6$)tetraalkoxysilanes and mixtures of two or more thereof, preferably ($C_1$-$C_5$) tetraalkoxysilanes and mixtures of two or more thereof, more preferably ($C_1$-$C_4$)tetraalkoxysilanes and mixtures of two or more thereof, more preferably ($C_1$-$C_3$) tetraalkoxysilanes and mixtures of two or more thereof,
wherein more preferably the one or more sources of Si comprise tetramethoxysilane and/or tetraethoxysilane, preferably tetraethoxysilane, and wherein more preferably the one or more sources of Si is tetramethoxysilane and/or tetraethoxysilane, preferably tetraethoxysilane.

18. The process of any one of embodiments 1 to 17, wherein the one or more sources of Ti comprises one or more compounds selected from the group consisting of titanium oxides, titanium salts, titanyl compounds, titanic acids, titanic acid esters, and mixtures of two or more thereof, preferably one or more compounds selected from the group consisting of tetrabutyl orthotitanate, tetraisopropyl orthotitanate, tetraethyl orthotitanate, titanium dioxide, titanium tetrachloride, titanium tert-butoxide, $TiOSO_4$ and/or $KTiOPO_4$, and a mixture of two or more thereof, more preferably from the group consisting of tetrabutyl orthotitanate, tetraisopropyl orthotitanate, tetraethyl orthotitanate, titanium dioxide, titanium tetrachloride, titanium tert-butoxide, and a mixture of two or more thereof, the titanium source preferably being tetramethyl and/or tetraethyl orthotitanate, more preferably tetraethyl orthotitanate.

19. The process of any one of embodiments 1 to 18, wherein the mixture prepared in (i) contains substantially no phosphorous and/or phosphorous containing compounds.

20. The process of any one of embodiments 1 to 19, wherein the framework of the zeolitic material obtained in (iii) contains substantially no phosphorous, wherein preferably the zeolitic material obtained in (iii) contains substantially no phosphorous and/or phosphorous containing compounds.

21. The process of any one of embodiments 1 to 20, wherein the Si:Ti molar ratio of the one or more sources of Si, calculated as $SiO_2$, to the one or more sources of Ti, calculated as $TiO_2$, of the mixture prepared in (i) ranges from 1 to 500, preferably from 2 to 200, more preferably from 5 to 150, more preferably from 10 to 100, more preferably from 20 to 70, more preferably from 25 to 50, more preferably from 30 to 45, and more preferably from 35 to 40.

22. The process of any one of embodiments 1 to 21, wherein in (ii) the mixture prepared in (i) is continuously fed into the continuous flow reactor for a duration ranging from 3 h to 360 d, more preferably from 6 h to 120 d, more preferably from 12 h to 90 d, more preferably from 18 h to 60 d, more preferably from 1 to 30 d, more preferably from 1.5 to 25 d, more preferably from 2 to 20 d, more preferably from 2.5 to 15 d, more preferably from 3 to 12 d, more preferably from 3.5 to 8 d, and more preferably from 4 to 6 d.

23. The process of any one of embodiments 1 to 22, wherein in (iii) the mixture is heated to a temperature in the range of from 90 to 280° C., preferably of from 110 to 250° C., more preferably of from 130 to 220° C., more preferably of from 150 to 200° C., more preferably of from 160 to 190° C., and more preferably of from 170 to 180° C.

24. The process of any one of embodiments 1 to 23, wherein in (iii) the mixture is heated under autogenous pressure, wherein preferably the pressure is in the range of from 0.5 to 15 MPa, more preferably in the range of from 1 to 10 MPa, more preferably from 1.5 to 8 MPa, more preferably from 2 to 6 MPa, more preferably from 2.5 to 5.5 MPa, more preferably from 3 to 5 MPa, more preferably from 3.5 to 4.5 MPa, and more preferably from 3.8 to 4.2 MPa.

25. The process of any one of embodiments 1 to 24, wherein prior to (ii) the mixture prepared in (i) is aged at a temperature in the range of from 40 to 120° C., preferably from 50 to 115° C., more preferably from 60 to 110° C., more preferably from 70 to 105° C., more preferably from 80 to 100° C., and more preferably from 85 to 95° C.

26. The process of any one of embodiments 1 to 25, wherein prior to (ii) the mixture prepared in (i) is aged for a duration ranging from 0.05 to 48 h, more preferably from 0.15 to 24 h, more preferably from 0.25 to 12 h, more preferably from 0.5 to 6 h, more preferably from 0.75 to 3 h, more preferably from 1 to 2 h, and more preferably from 1.25 to 1.75 h.

27. The process of any one of embodiments 1 to 26, wherein the mixture prepared in (i) is directly fed to the continuous flow reactor in (ii), wherein while being fed to the continuous flow reactor in (ii), the mixture prepared in (i) is pre-heated, preferably to a temperature in the range of from 90 to 280° C., preferably of from 110 to 250° C., more preferably of from 130 to 220° C., more preferably of from 150 to 200° C., more preferably of from 160 to 190° C., and more preferably of from 170 to 180° C.

28. The process of any one of embodiments 1 to 27, wherein the process further comprises
    (iv) treating the reaction product effluent continuously exiting the reactor in (iii) with a liquid comprising one or more solvents and/or via expansion of the reaction product effluent;
and/or, preferably and,
    (v) isolating the zeolitic material obtained in (iii) or (iv);
    (vi) optionally washing the zeolitic material obtained in (iii), (iv) or (v);
    (vii) drying the zeolitic material obtained in (iii), (iv), (v), or (vi);
and/or, preferably and,
    (viii) calcining the zeolitic material obtained in (iii), (iv), (v), (vi), or (vii).

29. The process of embodiment 28, wherein in (iv) the liquid comprises one or more solvents selected from the group consisting of polar protic solvents and mixtures thereof,
preferably from the group consisting of n-butanol, iso-propanol, propanol, ethanol, methanol, water, and mixtures thereof,
more preferably from the group consisting of ethanol, methanol, water, and mixtures thereof,
wherein more preferably the liquid comprises water, and wherein more preferably water is used as the liquid, preferably deionized water.

30. The process of embodiment 28 or 29, wherein in (iv) the liquid comprises one or more acids, preferably one or more organic and/or inorganic acids, more preferably one or more inorganic acids, wherein the one or more inorganic acids are preferably selected from the group consisting of HCl, HBr, $HNO_3$, $H_2SO_4$, and mixtures of two or more thereof, more preferably from the group consisting of HCl, $HNO_3$, $H_2SO_4$, and mixtures of two or more thereof, wherein more preferably the one or more acids comprise HCl and/or $HNO_3$, preferably $HNO_3$, wherein more preferably the acid is HCl and/or $HNO_3$, preferably $HNO_3$.

31. The process of embodiment 30, wherein in (iv) the reaction product effluent is neutralized with the one or more acids, preferably to a pH in the range of from 5 to 9, more preferably of from 6 to 8, and more preferably of from 6.5 to 7.5.

32. The process of any one of embodiments 28 to 31, wherein drying in (vii) is effected at a temperature in the range from 50 to 220° C., preferably from 70 to 190° C., more preferably from 80 to 170° C., more preferably from 90 to 150° C., more preferably from 100 to 140° C., and more preferably from 110 to 130° C.

33. The process of any one of embodiments 28 to 32, wherein the calcining in (viii) is effected at a temperature in the range from 300 to 700° C., preferably from 400 to 625° C., more preferably from 500 to 600° C., more preferably from 525 to 575° C., and more preferably from 540 to 560° C.

34. The process of any one of embodiments 28 to 33, wherein the supernatant obtained from the isolation of the zeolitic material in (v), and/or a feed having the same composition as said supernatant, is not at any point recycled to the reaction mixture during its passage through the continuous flow reactor.

35. The process of any one of embodiments 28 to 34, wherein in (v) isolating the zeolitic material includes a step of spray-drying and/or microwave drying the zeolitic material obtained in (iii) or (iv),
and/or
wherein in (vii) drying of the zeolitic material includes a step of spray-drying and/or microwave drying the zeolitic material obtained in (iii), (iv), (v), or (vi).

36. The process of any one of embodiments 1 to 35, wherein the mixture constituting the feed crystallized in (iii) consists of two liquid phases, wherein the first liquid phase is an aqueous phase comprising water, and the second liquid phase comprises a lubricating agent.

37. The process of embodiment 36, wherein the lubricating agent comprises one or more fluorinated compounds, preferably one or more fluorinated polymers, more preferably one or more fluorinated polyethers, and more preferably one or more perfluorinated polyethers.

38. The process of embodiment 36 or 37, wherein the lubricating agent comprises one or more fluorinated compounds, preferably one or more fluorocarbons, more preferably one or more perfluorocarbons, more preferably the lubricating agent comprises perfluorodecalin.

39. The process of any one of embodiments 36 to 38, wherein the lubricating agent comprises liquid paraffin.

40. The process of any one of embodiments 1 to 39, wherein the mixture crystallized in (iii) in the continuous flow reactor is mechanically agitated, wherein preferably mechanical agitation is achieved by movable parts contained in the continuous flow reactor, wherein more preferably the movable parts are provided such as to continually or periodically, preferably to continually free the walls of the continuous flow reactor from zeolitic materials and/or solid residue attached thereto, wherein more preferably the movable parts comprise a scraper, more preferably a screw, and more preferably a rotating screw.

41. The process of any one of embodiments 1 to 40, wherein the process further comprises
    (ix) subjecting the zeolitic material obtained in (v), (vi), (vii), or (viii) to an impregnation procedure, wherein one or more metal ion containing compounds are impregnated into the zeolitic material.

42. The process of embodiment 41, wherein the one or more metal ions are selected from the group consisting of ions of alkaline earth metal elements and/or transition metal elements, preferably from the group consisting of ions of metals selected from group Mg, Sr, Zr, Cr, Mo, Fe, Co, Ni, Cu, Zn, Ru, Rh, Pd, Ag, Os, Ir, Pt, Au, and mixtures of two or more thereof, more preferably from the group consisting of Mg, Sr, Cr, Mo, Fe, Co, Ni, Cu, Zn, Pt, Pd, Ag, and mixtures of two or more thereof, more preferably from the group consisting of Mg, Cr, Mo, Fe, Ni, Cu, Zn, Pt, Pd, Ag, and mixtures of two or more thereof, and even more preferably from the group consisting of Zn, Pd, Pt, and mixtures of two or more thereof.

43. A zeolitic material as obtainable and/or obtained according to the process of any one of embodiments 1 to 42.

44. A zeolitic material, preferably the zeolitic material of embodiment 42, said zeolitic material having an MFI- and/or MEL-type framework structure, preferably having an MFI-type framework structure, comprising Si, Ti, and O, wherein in the wavelength range of 200 to 800 nm the zeolitic material displays a UV-vis spectrum having a first maximum in the range of from 200 to 230 nm, preferably of from 202 to 225 nm, more preferably of from 204 to 220 nm, more preferably of from 206 to 215 nm, and more preferably of from 208 to 210 nm, and a second maximum in the range of from 235 to 320 nm, preferably of from 240 to 300 nm, more preferably of from 245 to 270 nm, more preferably of from 250 to 265 nm, and more preferably of from 258 to 262 nm, wherein the ratio of the absorbance of the first maximum to the absorbance of the second maximum is in the range of from 0.5 to 2.5, preferably of from 0.7 to 2, more preferably of from 0.9 to 1.8, more preferably of from 1 to 1.5, more preferably of from 1.1 to 1.3, and more preferably of from 1.15 to 1.25.

45. The zeolitic material of embodiment 44, wherein the UV-vis spectrum displays no further maximum between the first and second maxima.

46. The zeolitic material of embodiment 44 or 45, wherein the first and second maximum have the highest absorbance in the 200 to 800 nm range of the UV-vis spectrum.

47. The zeolitic material of any one of embodiments 44 to 46, wherein the deconvoluted $^{29}$Si MAS NMR of the zeolitic material comprises:
   a first peak (P"1) having a maximum in the range of from −111.5 to −114.5 ppm, preferably of from −112 to −114 ppm, and even more preferably of from −112.5 to −113.5 ppm; and
   a second peak (P"2) having a maximum in the range of from −101 to −105 ppm, preferably of from −102 to −104 ppm, and even more preferably of from −102.5 to −103.5 ppm, wherein the deconvoluted $^{29}$Si MAS NMR is preferably determined according to Reference Example 1.

48. The zeolitic material of embodiment 47, wherein the deconvoluted $^{29}$Si MAS NMR spectrum comprises one additional peak having a maximum in the range of from −114.6 to −118 ppm, more preferably of from −115 to −117 ppm, and even more preferably of from −115.5 to −116.5 ppm, wherein the deconvoluted $^{29}$Si MAS NMR is preferably determined according to Reference Example 1.

49. The zeolitic material of any one of embodiments 44 to 48, wherein the zeolitic material displays a BET specific surface area as determined according to ISO 9277:2010 in the range of from 300 to 700 m$^2$/g, preferably in the range of from 350 to 600 m$^2$/g, more preferably in the range of from 400 to 550 m$^2$/g, more preferably in the range of from 450 to 500 m2/g.

50. The zeolitic material of any one of embodiments 44 to 49, wherein the zeolitic material displays a water adsorption ranging from 8 to 15 weight-% when exposed to a relative humidity of 85%, wherein preferably the water adsorption ranges from 9 to 14 weight-%, more preferably from 10 to 13.5 weight-%, more preferably from 11 to 13 weight-%, and more preferably from 11.0 to 13.0 weight-%.

51. The zeolitic material of any one of embodiments 44 to 50, wherein the Si:Ti molar ratio of the zeolitic material ranges from 1 to 500, preferably from 2 to 200, more preferably from 5 to 150, more preferably from 10 to 100, more preferably from 20 to 70, more preferably from 25 to 50, more preferably from 30 to 45, and more preferably from 35 to 40.

52. The zeolitic material of any one of embodiments 44 to 51, wherein the zeolitic material having an MFI-type framework structure comprises TS-1, wherein more preferably the zeolitic material is TS-1.

53. The zeolitic material of any one of embodiments 44 to 52, wherein the zeolitic material is impregnated with one or more metal ion containing compounds, wherein the one or more metal ions are selected from the group consisting of ions of alkaline earth metal elements and/or transition metal elements, preferably from the group consisting of ions of metals selected from group Mg, Sr, Zr, Cr, Mo, Fe, Co, Ni, Cu, Zn, Ru, Rh, Pd, Ag, Os, Ir, Pt, Au, and mixtures of two or more thereof, more preferably from the group consisting of Mg, Sr, Cr, Mo, Fe, Co, Ni, Cu, Zn, Ag, and mixtures of two or more thereof, more preferably from the group consisting of Mg, Cr, Mo, Fe, Ni, Cu, Zn, Ag, and mixtures of two or more thereof, and even more preferably from the group consisting of Mg, Mo, Fe, Ni, Cu, Zn, Ag, and mixtures of two or more thereof.

54. The zeolitic material of any one of embodiments 44 to 53, wherein the framework of the zeolitic material contains substantially no phosphorous, wherein preferably the zeolitic material contains substantially no phosphorous and/or phosphorous containing compounds.

55. A process for preparing a molding, comprising
   (A) providing a zeolitic material according to any one of embodiments 44 to 54;
   (B) mixing the zeolitic material provided in step (A) with one or more binders;
   (C) optionally kneading of the mixture obtained in step (B);
   (D) molding of the mixture obtained in step (B) or (C) to obtain one or more moldings;
   (E) drying of the one or more moldings obtained in step (D); and
   (F) calcining of the dried molding obtained in step (E).

56. The process of embodiment 55, wherein the one or more binders are selected from the group consisting of inorganic binders, wherein the one or more binders preferably comprise one or more sources of a metal oxide and/or of a metalloid oxide, more preferably one or more sources of a metal oxide and/or of a metalloid oxide selected from the group consisting of silica, alumina, titania, zirconia, lanthana, magnesia, and mixtures and/or mixed oxides of two or more thereof, more preferably from the group consisting of silica, alumina, titania, zirconia, magnesia, silica-alumina mixed oxides, silica-titania mixed oxides, silica-zirconia mixed oxides, silica-lanthana mixed oxides, silica-zirconia-lanthana mixed oxides, alumina-titania mixed oxides, alumina-zirconia mixed oxides, alumina-lanthana mixed oxides, alumina-zirconia-lanthana mixed oxides, titania-zirconia mixed oxides, and mixtures and/or mixed oxides of two or more thereof, more preferably from the group consisting of silica, alumina, silica-alumina mixed oxides, and mixtures of two or more thereof, wherein more preferably the one or more binders comprise one or more sources of silica, wherein more preferably the binder consists of one or more sources of silica, wherein the one or more sources of silica preferably comprise one or more compounds selected from the group consisting of fumed silica, colloidal silica, silica-alumina, colloidal silica-alumina, and mixtures of two or more thereof, more preferably one or more compounds selected from the group consisting of fumed silica, colloidal silica, and mixtures thereof, wherein more preferably the one or more binders consists of colloidal silica.

57. The process of embodiment 55 or 56, wherein step (B) further comprises mixing the zeolitic material and the one or more binders with a solvent system, wherein the solvent system comprises one or more solvents, wherein preferably the solvent system comprises one or more hydrophilic solvents, the hydrophilic solvents preferably being selected from the group consisting of polar solvents, more preferably from the group consisting of polar protic solvents, wherein more preferably the solvent system comprises one or more polar protic solvents selected from the group consisting of water, alcohols, carboxylic acids, and mixtures of two or more thereof, more preferably from the group consisting of water, C1-C5 alcohols, C1-C5 carboxylic acids, and mixtures of two or more thereof, more preferably from the group consisting of water, C1-C4 alcohols, C1-C4 carboxylic acids, and mixtures of two or more thereof, more preferably from the group consisting of water, C1-C3 alcohols, C1-C3 carboxylic acids, and mixtures of two or more thereof, more preferably from the group consisting of water, methanol, ethanol, propanol, formic acid, acetic acid, and mixtures of two or more thereof, more preferably from the group consisting of water, ethanol, acetic acid, and mixtures of two or more thereof, wherein more preferably the solvent system comprises water and/or ethanol, and wherein more preferably the solvent system comprises water, wherein even more preferably the solvent system consists of water.

58. The process of any one of embodiments 55 to 57, wherein step (B) further comprises mixing the zeolitic material and the one or more binders with one or more pore forming agents and/or lubricants and/or plasticizers, wherein the one or more pore forming agents and/or lubricants and/or plasticizers are preferably selected from the group consisting of polymers, carbohydrates, graphite, plant additives, and mixtures of two or more thereof, more preferably from the group consisting of polymeric vinyl compounds, polyalkylene oxides, polyacrylates, polyolefins, polyamides, polyesters, cellulose and cellulose derivatives, sugars, sesbania cannabina, and mixtures of two or more thereof, more preferably from the group consisting of polystyrene, C2-C3 polyalkylene oxides, cellulose derivatives, sugars, and mixtures of two or more thereof, more preferably from the group consisting of polystyrene, polyethylene oxide, C1-C2 hydroxyalkylated and/or C1-C2 alkylated cellulose derivatives, sugars, and mixtures of two or more thereof, more preferably from the group consisting of polystyrene, polyethylene oxide, hydroxyethyl methyl cellulose, and mixtures of two or more thereof, wherein more preferably the one or more pore forming agents and/or lubricants and/or plasticizers consists of one or more selected from the group consisting of polystyrene, polyethylene oxide, hydroxyethyl methyl cellulose, and mixtures of two or more thereof, and more preferably wherein the one or more pore forming agents and/or lubricants and/or plasticizers consist of a mixture of polystyrene, polyethylene oxide, and hydroxyethyl methyl cellulose.

59. The process of any one of embodiments 55 to 58, wherein the calcining of the dried molding obtained in step (E) is performed at a temperature ranging from 350 to 850° C., preferably from 400 to 700° C., more preferably from 450 to 650° C., and more preferably from 475 to 600° C.

60. The process of any one of embodiments 55 to 59, further comprising
(G) subjecting the calcined molding obtained in step (F) to a hydrothermal treatment; wherein preferably the hydrothermal treatment is conducted under autogenous pressure, wherein more preferably the hydrothermal treatment is conducted at a temperature ranging from 80 to 200° C., preferably from 90 to 180° C., more preferably from 100 to 170° C., more preferably from 110 to 160° C., and more preferably from 120 to 150° C.

61. The process of embodiment 60, wherein the hydrothermal treatment is performed with a water containing solvent system and/or with an aqueous solution, wherein preferably the hydrothermal treatment is performed with distilled water or with an acidic solution having a pH in the range of from 3 to 6.5, preferably of from 4 to 5.5.

62. The process of embodiment 60 or 61, wherein the hydrothermal treatment is performed for a duration ranging from 1 to 48 hours, preferably from 2 to 36 hours, more preferably from 4 to 24 hours, more preferably from 5 to 12 hours, more preferably from 2 to 9 hours.

63. A molding obtained or obtainable according to the process of any one of embodiments 55 to 62.

64. Use of a zeolitic material according to any one of embodiments 43 or 54 or of a molding according to embodiment 63 as a catalyst, catalyst support, adsorbent, or for ion exchange, wherein preferably the molding is used as a catalyst and/or catalyst support, more preferably as a catalyst and/or catalyst support in a reaction involving C—C bond formation and/or conversion, and preferably as a catalyst and/or catalyst support in an isomerization reaction, in an ammoxidation reaction, in an amination reaction, in a hydrocracking reaction, in an alkylation reaction, in an acylation reaction, in a reaction for the conversion of alkanes to olefins, or in a reaction for the conversion of one or more oxygenates to olefins and/or aromatics, in a reaction for the synthesis of hydrogen peroxide, in an aldol condensation reaction, in a reaction for the isomerization of epoxides, in a transesterification reaction, or in an epoxidation reaction, preferably as a catalyst and/or catalyst support in a reaction for the epoxidation of olefins, more preferably in a reaction for the epoxidation of C2-C5 alkenes, more preferably in a reaction for the epoxidation of C2-C4 alkenes, in a reaction for the epoxidation of C2 or C3 alkenes, more preferably for the epoxidation of C3 alkenes, and more preferably as a catalyst for the conversion of propylene to propylene oxide.

The present invention is further illustrated by the following examples and reference examples.

EXPERIMENTAL SECTION

Reference Example 1: Determination of NMR Resonances

A sample was prepared for solid-state nuclear magnetic resonance (NMR) spectroscopy by packing it into a 7 mm $ZrO_2$ rotor with Kel-F cap. Measurements were performed using a Bruker Avance spectrometer equipped with a 7.05 Tesla magnet (300 MHz $^1H$ resonance frequency) under 5.0 kHz magic-angle sample spinning. Spectra were recorded as follows: $^{29}Si$ direct polarization 5 µs 90°-pulse, 30 ms acquisition of the free induction decay under 50 kHz heteronuclear proton decoupling, averaging over at least 156 transients with 120 s recycling delay, Fourier transformation with 20 Hz exponential line broadening. Resonances were indirectly referenced to neat tetramethylsilane, relating to the absolute chemical shift scale via adamantane as a secondary standard, with a $^{13}C$ methylene resonance at 37.77 ppm according to Pure Appl. Chem., 80(1):59 (2008). Line shape decompositions were performed with DMFit (Magn. Res. Chem. 40:70 (2002)). The parameter x in the sum x*Gauss+(1−x)*Lorentz was constrained to 0.5, 0.7 and 0.8 for the resonances near −103, −113 and −116 ppm, respectively.

Reference Example 2: Determination of the Water Adsorption/Desorption Isotherms Calculation of the water adsorption properties of the examples of the experimental section was performed on a VTI SA instrument from TA Instruments following a step-isotherm program. The experiment consisted of a run or a series of runs performed on a sample material that has been placed on the microbalance pan inside of the instrument. Before the measurement were started, the residual moisture of the sample was removed by heating the sample to 100° C. (heating ramp of 5° C./min) and holding it for 6 h under a $N_2$ flow. After the drying program, the temperature in the cell was decreased to 25° C. and kept isothermal during the measurements. The microbalance was calibrated, and the weight of the dried sample was balanced (maximum mass deviation 0.01 wt. %). Water uptake by the sample was measured as the increase in weight over that of the dry sample. First, an adsorption curve was measured by increasing the relative humidity (RH) (expressed as weight-% water in the atmosphere inside of the cell) to which the samples was exposed and measuring the water uptake by the sample at equilibrium. The RH was increased with a step of 10 wt. % from 5 to 85% and at each step the system controlled the RH and monitored the sample weight until reaching the equilibrium conditions and recording the weight uptake. The total adsorbed water amount by the sample was taken after the sample was exposed to the 85 weight-% RH. During the desorption measurement the RH was decreased from 85 wt. % to 5 wt. % with a step of 10% and the change in the weight of the samples (water uptake) was monitored and recorded.

Reference Example 3: UV-VIS Measurements

The UV-VIS measurements were performed using a PerkinElmer Lambda 950 equipped with a Labsphere 150 mm integrating sphere for the measurement of diffuse reflection (gloss trap closed). The powder cuvette used for the solid samples was filled with the solid samples so that the area measured was completely covered by the sample. As reference, Spectralon standard was used, integration time 0.2 s, scan speed 267 nm/min, spectral range 200-800 nm, measurement at room temperature. The spectra obtained were transformed to Kubelka-Munk spectra.

Reference Example 4: Determination of the Total Pore Volume

The total pore volume was determined via intrusion mercury porosimetry according to DIN 66133.

Reference Example 5: X-Ray Powder Diffraction and Determination of the Crystallinity Powder X-ray diffraction (PXRD) data was collected using a diffractometer (D8 Advance Series II, Bruker AXS GmbH) equipped with a LYNXEYE detector operated with a Copper anode X-ray tube running at 40 kV and 40 mA. The geometry was Bragg-Brentano, and air scattering was reduced using an air scatter shield.

Computing crystallinity: The crystallinity of the samples was determined using the software DIF-FRAC.EVA provided by Bruker AXS GmbH, Karlsruhe. The method is described on page 153 of the user manual. The default parameters for the calculation were used.

Computing phase composition: The phase composition was computed against the raw data using the modelling software DIFFRAC.TOPAS provided by Bruker AXS GmbH, Karlsruhe. The crystal structures of the identified phases, instrumental parameters as well the crystallite size of the individual phases were used to simulate the diffraction pattern. This was fit against the data in addition to a function modelling the background intensities.

Data collection: The samples were homogenized in a mortar and then pressed into a standard flat sample holder provided by Bruker AXS GmbH for Bragg-Brentano geometry data collection. The flat surface was achieved using a glass plate to compress and flatten the sample powder. The data was collected from the angular range 2 to 70° 2Theta with a step size of 0.02° 2Theta, while the variable divergence slit was set to a fixed angle of 0.1°. The crystalline content describes the intensity of the crystalline signal to the total scattered intensity. (User Manual for DIFFRAC.EVA V5.1 (2019), Bruker AXS GmbH, Karlsruhe.)

Reference Example 6: Providing a Synthesis Gel

For the gel preparation, 500 g tetraethylorthosilicate (TEOS) and 15 g tetraethylorthotitanate (TEOTi) were filled into a beaker. Then, 300 g deionized water and 220 g aqueous tetrapropylammonium hydroxide (TPAOH; 40 weight-% in water) were added under stirring (200 rpm). The resulting mixture had a pH of 13.50. The mixture was hydrolyzed at room temperature for 60 min during which the temperature rised to 60° C. The mixture had a pH of 12.18 then. Afterwards the ethanol was destilled off for about 130 min until the sump reached a temperature of 95° C., thus affording a synthesis gel with a molar ratio of Si:0.027 Ti:0.18 TPAOH:6.9 $H_2O$. During the distillation, 548 g of distillate was obtained for a theoretical amount of 454.4 g ethanol to be distilled off.

Example 1: Continuous Synthesis of a TS-1 Zeolite

For the continuous synthesis of a TS-1 zeolite a Teflon tube was used as reactor was used comprising a volume 160 ml and an inner diameter of 6.4 mm. The length of the reactor was 6 m, whereby the reactor could be heated over a length of about 5 m. The reactor and the lining to the reactor was filled with about 200 ml perfluorinated decalin, further a receiver tank was filled with about 470 ml of the synthesis gel of Reference Example 6. To start the reaction, a synthesis gel prepared according to Reference Example 6 was introduced into the reactor and a pressure was set to 5 bar using nitrogen gas, while the reactor was heated up to a temperature of 175° C. In order to monitor the reaction progress, the temperature of the reactor was recorded using four thermocouples fixed on the outside of the reactor tube. The temperature measured at the reactor inlet was 150° C., of the middle 175.4° C., of the reactor exit 176.2° C., and of the heat-exchanger positioned downstream of the reactor 24° C. In addition, the pressure was recorded on top of the receiver tank and also downstream at the exit of the reactor using a pressure indicator. After reaching the desired temperature, the pressure was increased to 40 bar. Downstream of the heat-exchanger positioned downstream of the reactor a tube with a volume of 1.3 ml is located. In addition thereto, a first ball valve is positioned at the intersection of the reactor and the tube and a second ball valve at the end of the tube. During the reaction process, the first ball valve opens shortly every 36 seconds allowing to release a volume of 1.3 ml of the zeolite product suspension from the reactor. Once the first ball valve is closed, the second ball valve opens allowing these 1.3 ml of product suspension to exit the reactor setup into a separate vessel where it is collected. This results in a semi-continuous flow of 1.3 mL/36 seconds, resulting in a semi-continuous flow of 302 g of starting gel through the reactor set-up.

After a reaction time of about 60 min, the decalin was removed from the reactor. In total, about 290 g of a suspension were obtained containing the zeolitic product. For work-up, the product suspension was acidified with aqueous nitric acid (10 weight-% $HNO_3$ in water) until a pH of about 7 was reached. Then, the suspension was filtered and the resulting solids washed with deionized water, subsequently dried at 120° C. for 4 h and then calcined at 490° C. for 5 h. According to XRD measurement, the reaction yielded 85 weight-% TS-1 zeolite as a product, which contained no crystalline anatase but only crystalline TS-1.

The resulting product had a Si content of 43 g/100 g, a Ti content of 1.9 g/100 g, a sodium content of less than 0.01 g/100 g, and a TOC of less than 0.03 g/100 g, showed a BET specific surface area of 478 $m^2$/g, and a Langmuir specific surface area of 635 $m^2$/g. The UV-VIS showed a first maximum at 209 nm with a relative intensity of 1.76 and a second maximum at 260 nm with a relative intensity of 1.47. The $^{29}$Si MAS NMR showed a first peak having a maximum at −103.1 ppm, a second peak having a maximum at 113.0 ppm, and a third peak having a maximum at 116.0 ppm. The water adsorption of the zeolitic material was 11.9 weight-% when exposed to a relative humidity of 85%.

Examples 2 and 3: Continuous Synthesis of a TS-1 Zeolite

The same procedure as per Example 1 was carried out, and the following longer running times were employed:

| | Running Time (hours) |
|---|---|
| Example 2 | 6 |
| Example 3 | 22 |

Furthermore, compared to Example 1, liquid paraffin was used instead of perfluorinated decalin as the lubricating agent.

In each of Examples 2 and 3, according to XRD measurement, the reaction yielded respectively 84 weight-% and 87 weight-% TS-1 zeolite as a product, which contained no crystalline anatase but only crystalline TS-1.

Regarding Example 2 wherein the running time was 6 hours, the product had a Si content of 42 g/100 g, a Ti content of 1.9 g/100 g, a sodium content of less than 0.01 g/100 g, showed a BET specific surface area of 462 $m^2$/g, and a Langmuir specific surface area of 633 $m^2$/g.

Regarding Example 3 wherein the running time was 22 hours, the product had a Si content of 44 g/100 g, a Ti content of 2.0 g/100 g, a sodium content of less than 0.01 g/100 g, and a TOC of 0.03 g/100 g, showed a BET specific surface area of 455 $m^2$/g, and a Langmuir specific surface area of 616 $m^2$/g.

Example 4: Preparation of a Molding 80 g of the TS-1 zeolite according to Example 1 were mixed with 3.0 g Walocel™ (Walocel MW 15000 GB, Wolff Cellulosics GmbH & Co. KG, Germany), and kneaded in a kneader for 5 min. Then, 75 g of an aqueous polystyrene dispersion (25.1 g polystyrene in water) were added and after kneading of the mixture for further 10 minutes, 1 g polyethylene alkoxide (PEO Alkox E160; Meisei Chemical works). After 10 min of further kneading, 50 g of an aqueous dispersion of silica (colloidal Ludox® AS 40) was added and subsequently 30 ml of deionized water. The total kneading time was 50 min. After that, the kneaded mass was subjected to shaping. For shaping, the kneaded mass was extruded at a pressure of 50 bar(abs) to give strands with a circular cross-section having a diameter of 1.9 mm. The strands were then dried and calcined in air according to the following program:

1. heating with a heating rate of 2° C./min to a temperature of 120° C.;
2. keeping the temperature of 120° C. for 4 h;
3. heating with a heating rate of 1° C./min to a temperature of 490° C.;
4. keeping the temperature of 490° C. for 5 h.

The yield was 86.6 g and the bulk density of the product was 390 g/ml.

The same procedure was repeated for the TS-1 zeolite according to Examples 2 and 3 to similarly obtain strands.

Example 5: Water Treatment of the Shaped Body 27 g of the material prepared according to Example 4 were mixed in three portions of each 9 g with 180 ml deioinzed water per portion. The resulting mixtures were heated at a temperature of 145° C. for 8 h in an autoclave. The water-treated strands were then dried and calcined according to the following program:

1. heating with a heating rate of 5° C./min up to 120° C.;
2. keeping the temperature of 120° C. for 5 h;
3. heating with a heating rate of 2° C./min up to 450° C.;
4. keeping the temperature of 450° C. for 2 h.

The yield was 26.8 g and the bulk density of the product was 440 g/ml. The resulting product had a Si content of 44 g/100 g, a Ti content of 1.5 g/100 g, and a TOC of less than 0.1 g/100 g, showed a BET specific surface area of 344 $m^2$/g, and a Langmuir specific surface area of 455 $m^2$/g. The total pore volume according to Reference Example 4 was 0.95 ml/g. The product contained 68 weight-% of TS-1 zeolite determined according to Reference Example 5, wherein the TS-1 zeolite contained 0.7 weight-% of crystalline anatase and 99.3 weight-% of crystalline TS-1 zeolite.

The same procedure was repeated for the further moldings of Example 4 (with TS-1 zeolite according to Examples 2 and 3) to similarly obtain strands.

Example 6: Catalytic Testing—Determination of the Propylene Epoxidation Catalytic Performance In a continuous epoxidation reaction setup, a vertically arranged tubular reactor (length: 1.4 m, outer diameter 10 mm, internal diameter: 7 mm) equipped with a jacket for thermostatization was charged with 15 g of the moldings in the form of strands as described in the respective examples above. The remaining reactor volume was filled with inert material (steatite spheres, 2 mm in diameter) to a height of about 5 cm at the lower end of the reactor and the remainder at the top end of the reactor. Through the reactor, the following starting materials were passed with the respective flow rates: methanol (49 g/h); hydrogen peroxide (9 g/h; employed as aqueous hydrogen peroxide solution with a hydrogen peroxide content of 40 weight-%); propylene (7 g/h; polymer grade). Via the cooling medium passed through the cooling jacket, the temperature of the reaction mixture was adjusted so that the hydrogen peroxide conversion, determined on the basis of the reaction mixture leaving the reactor, was essentially constant at 90%. The pressure within the reactor was held constant at 20 bar(abs), and the reaction mixture—apart from the fixed-bed catalyst—consisted of one single liquid phase.

The reactor effluent stream downstream the pressure control valve was collected, weighed and analyzed. Organic components were analyzed in two separate gas-chromatographs. The hydrogen peroxide content was determined colorimetrically using the titanyl sulfate method. The selectivity for propylene oxide given was determined relative to propene and hydrogen peroxide), and was calculated as 100 times the ratio of moles of propylene oxide in the effluent stream divided by the moles of propene or hydrogen peroxide in the feed.

The results of the catalytic testing of a TS-1 zeolite according to Example 1 are shown in FIG. 1, and the results of the catalytic testing of a TS-1 zeolite obtained according to Examples 2 and 3 are shown in FIGS. 2 and 3, respectively.

Obviously, the zeolitic material according to the present invention exhibits good selectivity values.

As can be gathered from FIG. 1, the average hydrogen conversion was about 85%, the average propylene oxide selectivity based on hydrogen peroxide was 91%, and the calculated yield of propylene oxide was 77%. Further, it was found that the zeolitic material of the present invention exhibit an excellent stability with respect to the propylene oxide selectivity relative to hydrogen peroxide over the whole testing time.

As can be gathered from FIG. 2, the temperature to reach ~90% hydrogen peroxide conversion only increased slightly even with extended running times. Thus, it may be gathered that the zeolitic material of the present invention exhibits an excellent stability over the whole testing time. Furthermore, as may be taken from FIG. 3, a selectivity towards propylene oxide of over 90% was maintained even when doubling the runtime compared to the results shown in FIG. 1.

CITED LITERATURE

Figure 1:
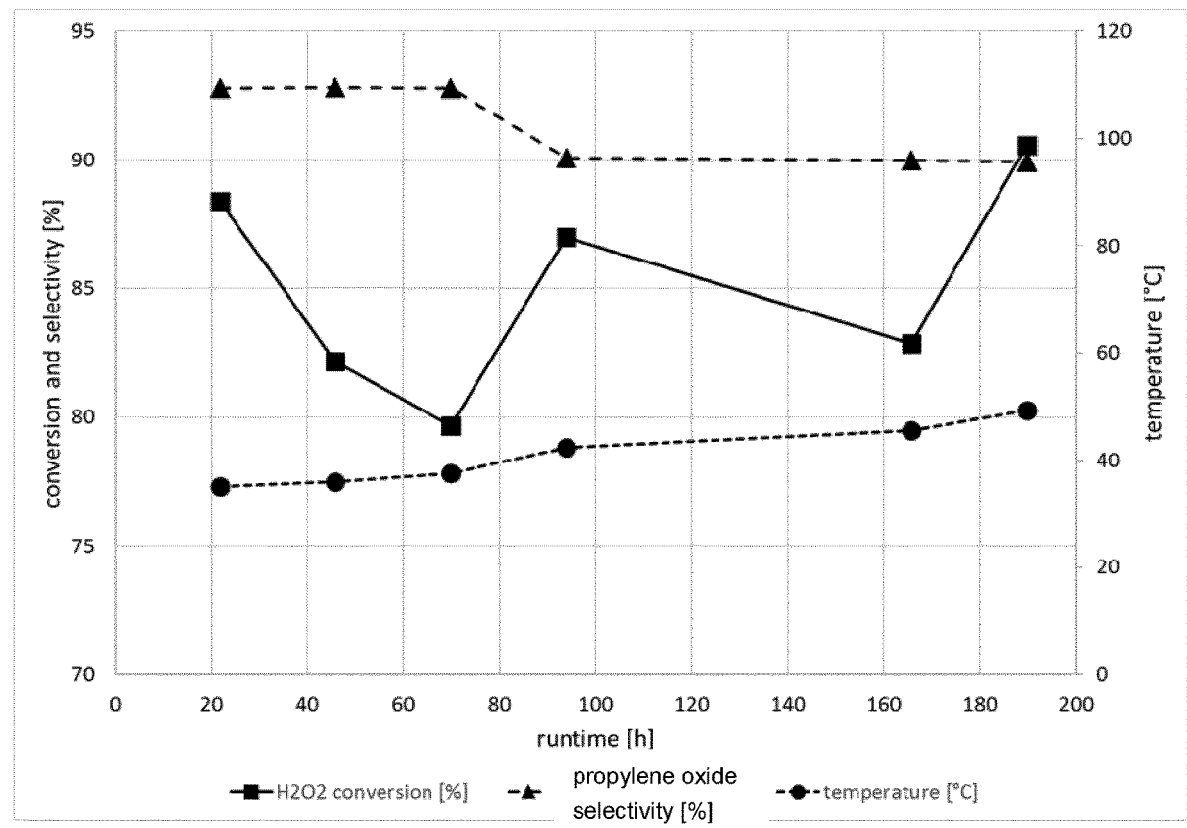
FIG. 1: shows the catalytic performance of the zeolitic material according to Example 1, in particular the propylene oxide selectivity relative to hydrogen peroxide (dashed line with triangles). The solid black line shows the hydrogen peroxide conversion, the dashed line with circles shows the temperature of the cooling medium flowing through the jacket of the reactor.
Figure 2:
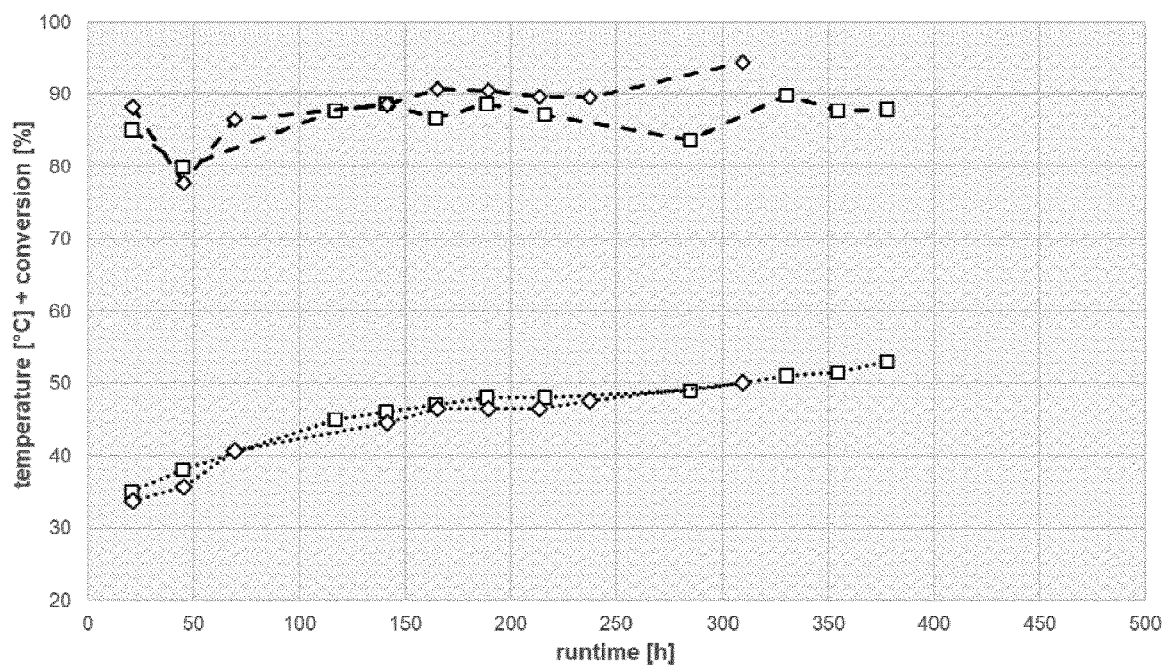
FIG. 2: shows the catalytic performance of the zeolitic material according to Examples 2 and 3, in particular the hydrogen peroxide conversion relative to temperature. The dashed line with squares shows the hydrogen peroxide conversion using the zeolitic material from Example 2 and the dashed line with diamonds the hydrogen peroxide conversion using the zeolitic material from Example 2, whereas the dotted line with squares shows the temperature of the cooling medium flowing through the jacket of the reactor when using the zeolitic material from Example 2, and the dotted line with diamonds the corresponding temperature of the cooling medium using the zeolitic material from Example 3.
Figure 3:
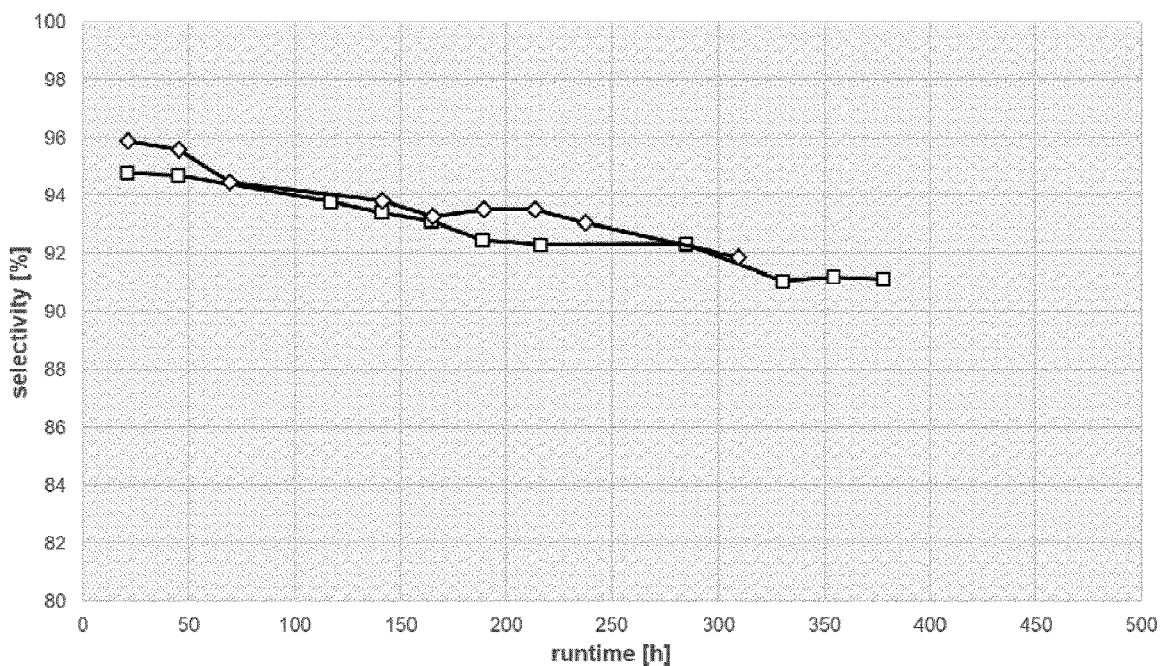
FIG. 3: shows the catalytic performance of the zeolitic material according to Examples 2 and 3, in particular the propylene oxide selectivity relative to hydrogen peroxide. The line with squares shows the propylene oxide selectivity using the zeolitic material from Example 2, and the line with diamonds shows the propylene oxide selectivity using the zeolitic material from Example 3.

Y. Hu et al. in Microporous and Mesoporous Materials 2018, 270, 149
CN 110028078 A
DE 3029787 A1
EP 0402801 A2
U.S. Pat. No. 4,374,093
U.S. Pat. No. 6,656,447 B1
CN110078091 A

The invention claimed is:

1. A continuous process for preparing a zeolitic material having an MFI framework structure type comprising TS-1, comprising Si, Ti, and O, said process comprising
   (i) preparing a mixture comprising one or more sources of Si, one or more sources of Ti, one or more tetraalkylammonium cation $R^1R^2R^3R^4N^+$-containing compounds as structure directing agent, and water;
   (ii) continuously feeding the mixture prepared in (i) into a continuous flow reactor; and
   (iii) crystallizing the zeolitic material having an MFI framework structure type, wherein the mixture is heated to a temperature in the range of from 130 to 220° C., wherein $R^1$, $R^2$, $R^3$, and $R^4$ independently from one another stand for alkyl, and wherein the $H_2O$:Si molar ratio of water to the one or more sources of Si calculated as $SiO_2$ in the mixture prepared in (i) is in the range of from 3 to 11;
   wherein the mixture constituting the feed crystallized in (iii) consists of a first liquid phase and a second liquid phase, wherein the first liquid phase is an aqueous phase comprising water, and the second liquid phase comprises a lubricating agent;
   wherein the lubricating agent comprises one or more fluorinated compounds or a liquid paraffin.

2. The process of claim 1, wherein the $H_2O$: Si molar ratio of water to the one or more sources of Si calculated as $SiO_2$ in the mixture prepared in (i) is in the range of from 4 to 10.

3. The process of claim 1, wherein the continuous flow reactor is selected among a tubular reactor, a ring reactor, and a continuously oscillating reactor.

4. The process of claim 1, wherein the mixture prepared in (i) and crystallized in (iii) displays a molar ratio of the one or more tetraalkylammonium cation $R^1R^2R^3R^4N^+$-containing compounds to the one or more sources of Si calculated as Si in the range of from 0.001 to 1.5.

5. The process of claim 1, wherein the Si: Ti molar ratio of the mixture prepared in (i) is in the range of from 1 to 500.

6. The process of claim 1, wherein in (iii) the mixture is heated under autogenous pressure.

7. The process of claim 1, wherein the mixture prepared in (i) is directly fed to the continuous flow reactor in (ii), wherein while being fed to the continuous flow reactor in (ii), the mixture prepared in (i) is pre-heated.

8. The process of claim 1, wherein the process further comprises (iv) treating the reaction product effluent continuously exiting the reactor in (iii) with a liquid comprising one or more solvents and/or via expansion of the reaction product effluent;

and/or (v) isolating the zeolitic material obtained in (iii) or (iv);

(vi) optionally washing the zeolitic material obtained in (iii), (iv) or (v);

(vii) drying the zeolitic material obtained in (iii), (iv), (v), or (vi);

and/or (viii) calcining the zeolitic material obtained in (iii), (iv), (v), (vi), or (vii).

9. The process of claim 1, wherein the $H_2O$:Si molar ratio of water to the one or more sources of Si calculated as $SiO_2$ in the mixture prepared in (i) is in the range of from 5 to 9.

10. The process of claim 1, further comprising:

(B) mixing the prepared zeolitic material having a framework structure type MFI, comprising Si, Ti, and O—with one or more binders;

(C) optionally kneading of the mixture obtained in step (B);

(D) molding of the mixture obtained in step (B) or (C) to obtain one or more moldings;

(E) drying of the one or more moldings obtained in step (D); and (F) calcining of the dried molding obtained in step (E).

11. The process of claim 10, further comprising:

(G) subjecting the calcined molding obtained in step (F) to a hydrothermal treatment.

12. The process of claim 1, wherein the continuous feeding in (ii) is performed at a liquid hourly space velocity in the range of from 0.05 to 5 h−1;

wherein the volume of the continuous flow reactor is in the range of from 50 cm3 to 75 m3; and wherein the surface of the inner wall of the continuous flow reactor is lined with an organic polymer material.

* * * * *